US011895346B2

(12) United States Patent
Nadathur et al.

(10) Patent No.: US 11,895,346 B2
(45) Date of Patent: Feb. 6, 2024

(54) TECHNIQUES FOR SECURE VIDEO FRAME MANAGEMENT

(71) Applicant: APPLE INC., Cupertino, CA (US)

(72) Inventors: Anush G. Nadathur, San Jose, CA (US); Keith W. Rauenbuehler, San Francisco, CA (US); Kenneth A. York, San Jose, CA (US); Varinder Singh, Mountain View, CA (US); Nicholas M. Fraioli, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/953,258

(22) Filed: Sep. 26, 2022

(65) Prior Publication Data

US 2023/0088057 A1 Mar. 23, 2023

Related U.S. Application Data

(63) Continuation of application No. 16/560,678, filed on Sep. 4, 2019, now Pat. No. 11,482,005.

(51) Int. Cl.
*H04N 21/2347* (2011.01)
*G06V 20/40* (2022.01)
(Continued)

(52) U.S. Cl.
CPC ......... *H04N 21/2347* (2013.01); *G06V 10/44* (2022.01); *G06V 10/764* (2022.01);
(Continued)

(58) Field of Classification Search
CPC .. G06T 1/00; G06T 7/00; G06V 10/96; G06V 10/25
See application file for complete search history.

(56) References Cited

U.S. PATENT DOCUMENTS 7,508,941 B1  3/2009 O'Toole, Jr. et al.
9,412,268 B2  8/2016 Saptharishi et al.
(Continued)

FOREIGN PATENT DOCUMENTS

CN  109565605 A  4/2019
EP    2835978 A2  2/2015
(Continued)

OTHER PUBLICATIONS

Application No. CN202080039171.9, Office Action, dated Feb. 24, 2023, 10 pages.
(Continued)

*Primary Examiner* — Guillermo M Rivera-Martinez
(74) *Attorney, Agent, or Firm* — Kilpatrick Townsend & Stockton LLP

(57) ABSTRACT

Disclosure provides devices, methods, and computer-readable medium for secure frame management. Techniques disclosed herein provide an intelligent method for detecting triggering items in one or more frames of streaming video from an Internet Protocol camera. Upon detection, the camera transmits one or more frames of the video over a network to a computing device. Upon detecting a triggering item in a frame of the video stream, the computing device begins a streaming session with a server and stream the one or more frames of video and accompanying metadata to the server. The frames, metadata, and associated keys can all be encrypted prior to streaming to the server. For each subsequent segment of video frames that includes the triggering item, the server can append the frames of that segment to the video clip in an encrypted container. Once the triggering item is no longer detected, the streaming session can be closed.

20 Claims, 9 Drawing Sheets

Related U.S. Application Data

(60) Provisional application No. 62/853,408, filed on May 28, 2019.

(51) Int. Cl.

| | | |
|---|---|---|
| *G06V 10/764* | (2022.01) | |
| *H04L 9/08* | (2006.01) | |
| *H04N 5/14* | (2006.01) | |
| *G06V 20/52* | (2022.01) | |
| *G06V 20/64* | (2022.01) | |
| *H04N 23/61* | (2023.01) | |
| *G06V 10/82* | (2022.01) | |
| *G06V 10/44* | (2022.01) | |

(52) U.S. Cl.
CPC .............. *G06V 10/82* (2022.01); *G06V 20/46* (2022.01); *G06V 20/52* (2022.01); *G06V 20/64* (2022.01); *H04L 9/0822* (2013.01); *H04N 5/144* (2013.01); *H04N 23/61* (2023.01); *G06V 20/44* (2022.01)

(56) References Cited

U.S. PATENT DOCUMENTS

| | | | |
|---|---|---|---|
| 9,635,317 | B1 | 4/2017 | Ludwig et al. |
| 11,482,005 | B2 | 10/2022 | Nadathur et al. |
| 2002/0059144 | A1 | 5/2002 | Meffert et al. |
| 2002/0151992 | A1 | 10/2002 | Hoffberg et al. |
| 2004/0093419 | A1 | 5/2004 | Weihl et al. |
| 2008/0198159 | A1 | 8/2008 | Liu et al. |
| 2011/0096922 | A1* | 4/2011 | Oya ............... H04N 7/183 380/28 |
| 2011/0173235 | A1 | 7/2011 | Aman et al. |
| 2013/0047264 | A1* | 2/2013 | Bjorkengren ...... H04N 21/4627 726/27 |
| 2014/0063247 | A1 | 3/2014 | Bernal et al. |
| 2014/0223475 | A1 | 8/2014 | Mcintire et al. |
| 2016/0182952 | A1 | 6/2016 | Wu et al. |
| 2016/0358017 | A1 | 12/2016 | Guzik |
| 2017/0208349 | A1 | 7/2017 | Saptharishi |
| 2017/0359423 | A1 | 12/2017 | Nadathur et al. |
| 2017/0359555 | A1 | 12/2017 | Irani et al. |
| 2018/0061064 | A1 | 3/2018 | Schwartz et al. |
| 2018/0167686 | A1* | 6/2018 | James ............... H04N 21/4725 |
| 2018/0176112 | A1 | 6/2018 | McLaughlin et al. |
| 2018/0220189 | A1 | 8/2018 | Hodge et al. |
| 2018/0225230 | A1 | 8/2018 | Litichever et al. |
| 2018/0331824 | A1* | 11/2018 | Racz ..................... H04L 9/14 |
| 2020/0106990 | A1* | 4/2020 | Farzone ............... H04L 9/0825 |

FOREIGN PATENT DOCUMENTS

| | | | |
|---|---|---|---|
| WO | 2011144510 | A1 | 11/2011 |
| WO | 2015153723 | A1 | 10/2015 |

OTHER PUBLICATIONS

U.S. Appl. No. 16/560,678, First Action Interview Office Action Summary, dated Dec. 8, 2021, 8 pages.

U.S. Appl. No. 16/560,678, First Action Interview Pilot Program Pre-Interview Communication, dated Aug. 3, 2021, 5 pages.

U.S. Appl. No. 16/560,678, Notice of Allowance, dated Jun. 10, 2022, 13 pages.

India Patent Application No. 202117055179, First Examination Report, dated May 25, 2022, 7 pages.

International Patent Application No. PCT/US2020/034763, International Preliminary Report on Patentability, dated Dec. 9, 2021, 9 pages.

International Patent Application No. PCT/US2020/034763, International Search Report and Written Opinion, dated Jul. 22, 2020, 13 pages.

The Chinese Application No. CN202080039171.9, "Notice of Decision to Grant", dated Sep. 19, 2023, 4 pages (Relevance: Notice of Decision to Grant related Chinese patent application).

The Chinese Application No. CN202080039171.9, "Office Action", dated Jul. 3, 2023, 7 pages.

The European Application No. EP20732451.8, "Office Action", dated Aug. 3, 2023, 9 pages.

\* cited by examiner

TECHNIQUES FOR SECURE VIDEO FRAME MANAGEMENT

CROSS-REFERENCES TO RELATED APPLICATIONS

This application is a continuation of U.S. application Ser. No. 16/560,678, filed Sep. 4, 2019, entitled "Techniques For Secure Video Frame Management, which claims priority to and incorporates by reference commonly-owned U.S. Patent Application No. 62/853,408, filed May 28, 2019, entitled "Techniques for Secure Video Frame Management," in its entirety and for all purposes. This application also incorporates by reference commonly-owned U.S. patent application Ser. No. 15/996,387, filed on Jun. 1, 2018, entitled "Synchronizing Content," in its entirety and for all purposes. This application also incorporates by reference commonly-owned U.S. patent application Ser. No. 16/428,914, filed on May 3, 2019, entitled "Synchronizing Content," in its entirety and for all purposes.

BACKGROUND

Internet Protocol cameras have become increasingly popular accessories that are part of home network systems. Routines for the cameras can detect motion, and activate the camera. However passing vehicles, pedestrians, and waving tree branches can trigger the motion detection on the camera resulting in false alerts.

In addition, many Internet Protocol cameras store the video stream data to cloud storage services that are often located external to the location of the cameras. Storage by the cloud service can be immutable, meaning that the data cannot be modified or changed. So if large files such as digital assets are pushed to the cloud they must be pushed in one transfer. Otherwise, a file that is several megabytes large, would result in several smaller partial files being stored in the cloud storage. In some cases, garbage collection policies for the cloud storage services may only delete these partial files every few days resulting in excessive storage usage.

Often, the video streams from the cameras are encrypted. Many existing video systems conduct analysis and processing with the video data stored in the cloud. Those systems therefore allow the cloud server to have access to both the encrypted data and the keys. Even if the data is encrypted, the managers of the cloud have the keys for decrypting the data. Therefore, the cloud system could decrypt the video data and have access to a user's private video information.

Computing devices that process and analyze the video data from Web based cameras also perform other tasks such as manage home networks or act as media access devices that provides up to 4K video data to a user. In networks with several IP cameras, the processing power of the computing device can be taxes so much that the computing device cannot simultaneously perform other tasks due to processing limitations.

Home networks can allow others to access the secure data from one or more Internet cameras. However, existing permission schemes only allow another user access to all secure data if granted access to an existing system. For example, a homeowner may want to grant a friend access to outside cameras but restrict the friend's access to interior cameras.

SUMMARY

Embodiments of the present disclosure can provide devices, methods, and computer-readable medium for secure frame management. The techniques disclosed herein provide an intelligent method for detecting triggering items in one or more frames of streaming video from an Internet Protocol camera. Upon detection, the camera transmit one or more frames of the video over a network to a computing device. The computing device can identify a triggering item, in a frame of the video stream, that instructs the computing device to begin a streaming session with a server and stream the one or more frames of video and accompanying metadata to the server. The frames, metadata, and associated keys can all be encrypted prior to streaming to the server. Once the user device begins streaming the frames of video and accompanying metadata, it can continue to stream subsequent frames of video and metadata until the triggering item is no longer detected. For each subsequent segment of video frames that includes the triggering item, the server can append the frames of that segment to the video clip in an encrypted container. Once the triggering item is no longer detected, the streaming session can be closed. The encrypted container will not be able to decrypt the container at least because the keys for accessing the frames are encrypted within the encrypted container. A user device associated with the computing device can have the keys so that the user can view the video stream in real-time (or later) stored at the server.

In various embodiments, the technique for secure frame management can include receiving, in response to detection of motion by a camera connected to a network, by a computing device, one or more frames of a video stream and accompanying metadata from the camera. The technique can include classifying, by the computing device, the one or more frames of the video stream by at least comparing one or more aspects of the one or more frames of the video stream from the camera against one or more criteria. The technique can include reviewing, by the computing device, each frame of the one or more frames of the video stream for a triggering item. In accordance with detection of the triggering item in at least one frame of the one or more frames of the video stream, the technique can include establishing, by the computing device, a connection with a network computing device. The technique can include encrypting, by the computing device, the one or more frames of the video stream and the accompanying metadata. The technique can include transmitting, to the network computing device over the connection, the one or more frames of the video stream and the accompanying metadata, the network computing device configured to store the encrypted one or more frames of the video stream and the encrypted accompanying metadata in a container.

The technique can further include encrypting, by the computing device, one or more subsequent frames of the video stream and subsequent metadata. The technique can include transmitting, to the network computing device over the connection, the encrypted one or more subsequent frames of the video stream and the encrypted subsequent metadata, the network computing device configured to append the one or more encrypted subsequent frames of the video stream onto the one or more frames of the video stream and to store the encrypted subsequent metadata in the container. In accordance with detection of an absence of the triggering item in at least one subsequent frame of the one or more subsequent frames of the video stream, the technique can include terminating the connection with the network computing device.

In various embodiments, the classifying can include utilizing an image recognition technique to determine a classification of the one or more frames of the video stream. In embodiments, the classification can include multiple different classes including at least one of a person, an animal, and a vehicle.

In various embodiments, the techniques can include decrypting the one or more frames of the video stream from the camera. The accompanying metadata can identify a start time and an end time of the one or more frames of the video stream. The container can be encrypted using a 256-bit encryption key.

In various embodiments, the one or more frames of the video stream can include a fragment of live video stream data from the camera. The computing device can be configured to play the one or more frames of the video stream using an HTTP-based adaptive bitrate streaming communication protocol.

The techniques can include providing instructions to a second computing device to balance a load between the computing device and the second computing device. The technique can also include performing balancing operations between one or more processors for a load of the one or more frames of the video stream being received from the camera. The balancing operations can include reassigning operations to a second computing device based at least in part on bandwidth of the one or more processors of the computing device and network bandwidth. The techniques can include assigning access control of a specific camera to a user outside a primary network.

In various embodiments, the techniques for accessory control can be stored as a plurality of instructions in a computer readable medium.

In various embodiments, the techniques for accessory control can be incorporated in a computing device, including one or more memories, and one or more processors in communication with the one or more memories and configured to execute instructions stored in the one or more memories.

The following detailed description together with the accompanying drawings will provide a better understanding of the nature and advantages of the present disclosure.

DETAILED DESCRIPTION

Certain embodiments of the present disclosure relate to devices, computer-readable medium, and methods for implementing various techniques for secure frame management. In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. The present disclosure describes devices and methods for secure frame management for Internet Protocol cameras as part of a home network.

I. Example Environment

Figure 1:
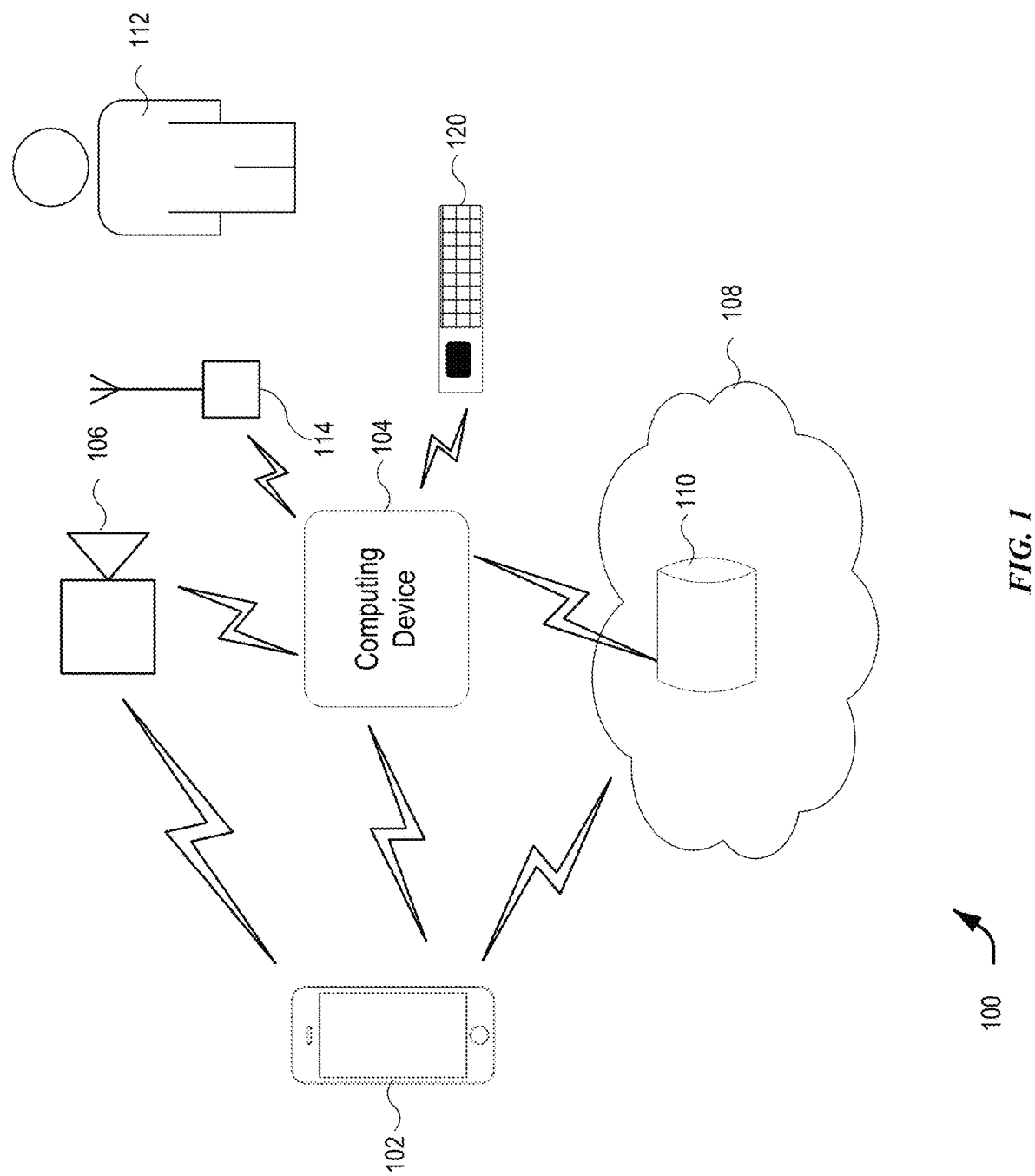
FIG. 1 illustrates a simplified network environment according to an embodiment of the present disclosure.

FIG. 1 shows a network environment 100 according to an embodiment of the present disclosure. In some embodiments, the network environment 100 can be a home network. Network environment 100 includes a controller 102 that can communicate with various accessory devices (also referred to as accessories) located in the environment. Controller 102 can include, for example, a desktop computer, laptop computer, tablet computer, smart phone, wearable computing device, personal digital assistant, or any other computing device or set of devices that can be capable of communicating command-and-control messages to accessories and presenting a user interface to allow a user to indicate desired operations on the accessories. In some embodiments, controller 102 can be implemented using multiple discrete devices. For example, there can be a base station that communicates with accessories and that can be installed in a fixed location in environment 100, and one or more mobile remote-control stations (e.g., a handheld or wearable device such as a mobile phone, tablet computer, smart watch, eyeglasses, etc.) that provide a user interface and communicate with the base station to effect control over accessories.

Any type of accessory device can be controlled. Examples of accessory devices can include a camera 106. In some instances, controller 102 can communicate directly with an accessory; for instance, controller 102 is shown communicating directly with the camera 106. In other instances, controller 102 can communicate via an intermediary. For instance, controller 102 is shown communicating via a computing device 104 with accessories such as the camera 106 that are on a wireless network. In some embodiments, the controller 102 can control a computing device 104. In some embodiments, the computing device 104 can provide access to multimedia content in addition to providing support as a hub for a home network. In some embodiments the computing device can have a separate proprietary controller 120. In some embodiments the computing device 104 can be a dedicated home hub device, a media access device, or a tablet computer.

Various communication transports and combinations of transports can be used, and different transports can be used with different devices. For example, some wireless transports such as the Bluetooth® Classic or Bluetooth® Smart communication protocol and standards promulgated by the Bluetooth SIG (referred to herein as "Bluetooth" and "Bluetooth LE") can support direct point-to-point communication between devices within a limited range. Other wireless transports such as a wireless network complying with Wi-Fi® networking standards and protocols promulgated by the Wi-Fi Alliance (referred to herein as a "Wi-Fi network") can define a wireless network with a central access point that can facilitate communications between different devices on the network. Further, while wireless communication transports are shown, wired transports can also be provided for some or all of the accessories. For example, camera 106 can be connected to access point 114 by a wired connection, and controller 102 can communicate with camera 106 by sending messages wirelessly to access point 114, which can deliver the messages to camera 106 via the wired connection. Other combinations of wired and wireless communication are also possible.

Further, while one controller 102 is shown, the network environment can have multiple associated controller devices. In various embodiments, controller 102 is a universal controller able to be programmed to control one or more devices or accessories from various manufacturers. In some embodiments, controller 102 can include a touch screen liquid crystal display (LCD). Some LCD touch screens include "virtual buttons" on the display of the remote. In some embodiments, the user interface elements (buttons) on the device can be programmed and reprogrammed to perform other functions. In some embodiments, the display of the controller 102 can register physical gestures of a user. In some embodiments, the controller 102 contains one of more accelerometer or gyrometer to detect movement of the controller. Some embodiments of controllers allow for changing the configuration of how the virtual buttons are displayed on the controller 102. In some embodiments, the controller 102 can use radio frequency waves to operate devices in which obstacles block a traditional infrared signal. A controller 102 using radio frequency waves can be used to control electronics in the next room.

Many controller devices claim to use Bluetooth for universal control accessories. However, often what actually occurs is that the controller devices send a Bluetooth signal to a hub. The hub incorporates an infrared blaster that sends out the remote control command signals via infrared from the blaster. These communications are also a one-way communication channel from the controller device or the hub to the device. For traditional universal controllers, the remote knows what function the user is commanding when a user interface element is activated. The controller described in the present disclosure is open ended because the controller does not have the knowledge about the activation. In some embodiments, the technique includes authorizing the controller to control one or more accessories of various types that are wirelessly connected to the computing device.

In some embodiments, a uniform accessory protocol can facilitate communication by a controller 102 with one or more accessories (e.g., the camera 106). The uniform accessory protocol can provide a simple and extensible framework that models an accessory as a collection of services, with each service being defined as a set of characteristics, each of which has a defined value at any given time. Various characteristics can represent various aspects of the accessory's state. For example, in the case of camera, characteristics can include power (on or off), battery level, and state (transmitting, not-transmitting). In some embodiments, message formats may be transport-dependent while conforming to the same accessory model. An accessory can provide an "attribute database" that identifies the services and characteristics that the accessory exposes to controllers. A controller 102 can read the attribute database (or a portion thereof) from an accessory and use the attribute database to determine how to interact with the accessory.

The uniform accessory protocol can further define message formats for controller 102 to send command-and-control messages (requests) to an accessory (or other accessories) and for an accessory to send response messages to controller 102. The command-and-control messages can allow controller 102 to interrogate the current state of accessory characteristics (e.g., by sending a read request) and in some instances to modify the characteristics (e.g., sending a request to write to the power characteristic can result in turning an accessory off or on). Accordingly, any type of accessory, regardless of function or manufacturer, can be controlled by sending appropriate messages. The message format can be the same across accessories of disparate types.

The uniform accessory protocol can further provide notification mechanisms that allow an accessory (or other accessories) to selectively notify controller 102 in the event of a state change. Multiple mechanisms can be implemented, and controller 102 can register, or subscribe, for the most appropriate notification mechanism for a given purpose.

In some embodiments, communication with a given accessory can be limited to controllers that have received authorization. For instance, the uniform accessory protocol can specify one or more mechanisms (including mechanisms referred to herein as "pair setup" and "pair add") for establishing a "pairing" (also referred to herein as a "local pairing") between controller 102 and a given accessory (e.g., door lock accessory) under circumstances that provide a high degree of confidence that the user intends for controller 102 to be able to control accessory. Pair setup can include an out-of-band information exchange (e.g., the user can enter a numerical or alphanumeric PIN or passcode provided by accessory into an interface provided by controller 102) to establish a shared secret. This shared secret can be used to support secure exchange of "long-term" public keys between controller 102 and accessory, and each device can store the long-term public key received from the other, so that an established pairing can be persistent. After a local pairing is established, controller 102 is considered authorized, and thereafter, controller 102 and accessory can go in and out of communication as desired without losing the established pairing. When controller 102 attempts to communicate with or control accessory, a "pair verify" process specified by the uniform accessory protocol can first be performed to verify that an established local pairing exists (as would be the case, e.g., where controller 102 previously completed pair setup with accessory). The pair verify process can include each device demonstrating that it is in possession of a long-term private key corresponding to the long-term public key that was exchanged during pair setup and can further include establishing a new shared secret or session key to encrypt all communications during a "pair-verified" session, (also referred to herein as a verified session). During a pair-verified session, a controller that has appropriate privileges can perform a "pair add" process to establish another pairing with the accessory on behalf of another controller. Either device can end a pair-verified session at any time simply by destroying or invalidating its copy of the session key.

In some embodiments, multiple controllers can establish a local pairing with the same accessory (e.g., by performing pair setup or by having a pairing added by a controller that previously performed pair setup), and the accessory can accept and respond to communications from any of its paired controllers while rejecting or ignoring communications from unpaired controllers. In some embodiments of the present disclosure, additional "relay pairing" processes can be defined and used to allow controllers to communicate with accessories via a relay service external to the local environment.

It will be appreciated that the environment 100 is illustrative and that variations and modifications are possible. Embodiments of the present disclosure can be implemented in any environment where a user wishes to control one or more accessory devices using a controller device, including but not limited to homes, cars or other vehicles, office buildings, campuses having multiple buildings (e.g., a university or corporate campus), etc. A single controller can establish pairings with any number of accessories and can selectively communicate with different accessories at different times. Similarly, a single accessory can be controlled by multiple controllers with which it has established pairings. Any function of an accessory can be controlled by modeling the function as a service having one or more characteristics and allowing a controller to interact with (e.g., read, modify, receive updates) the service and/or its characteristics. Accordingly, protocols and communication processes used in embodiments of the disclosure can be uniformly applied in any context with one or more controllers and one or more accessories, regardless of accessory function or controller form factor or specific interfaces.

The environment can also consist of a cloud storage system 108. The cloud storage system 108 can be located at a data storage facility remote from the home. Cloud storage is a model of computer data storage in which the digital data is stored in logical pools. The physical storage spans multiple servers (sometimes in multiple locations), and the physical environment is typically owned and managed by a hosting company. These cloud storage providers are responsible for keeping the data available and accessible, and the physical environment protected and running. People and organizations buy or lease storage capacity from the providers to store user, organization, or application data. Cloud storage services may be accessed through a co-located cloud computing service, a web service application programming interface (API) or by applications that utilize the API, such as cloud desktop storage, a cloud storage gateway or Web-based content management systems.

In some embodiments, the cloud storage system 108 can comprise a secure container 110. The secure container 110 can be used to store the streaming video and associated metadata from an accessory (e.g., an IP camera). The secure container 110 can store encrypted data or can encrypt the data stored in the container. In some embodiments, the streaming video data can be appended as additional video data is streamed to the cloud storage system 108. In some embodiments, the techniques can encode the container using the techniques disclosed in U.S. patent application Ser. No. 15/996,387, filed on Jun. 1, 2018, entitled "Synchronizing Content," or the techniques described in U.S. patent application Ser. No. 16/428,914, filed on May 3, 2019, entitled "Synchronizing Content."

In some embodiments, the environment 100 can include a person 112 or person(s). The image of the person 112 or person(s) can be captured by the camera 106.

II. Network Configuration

Figure 2:
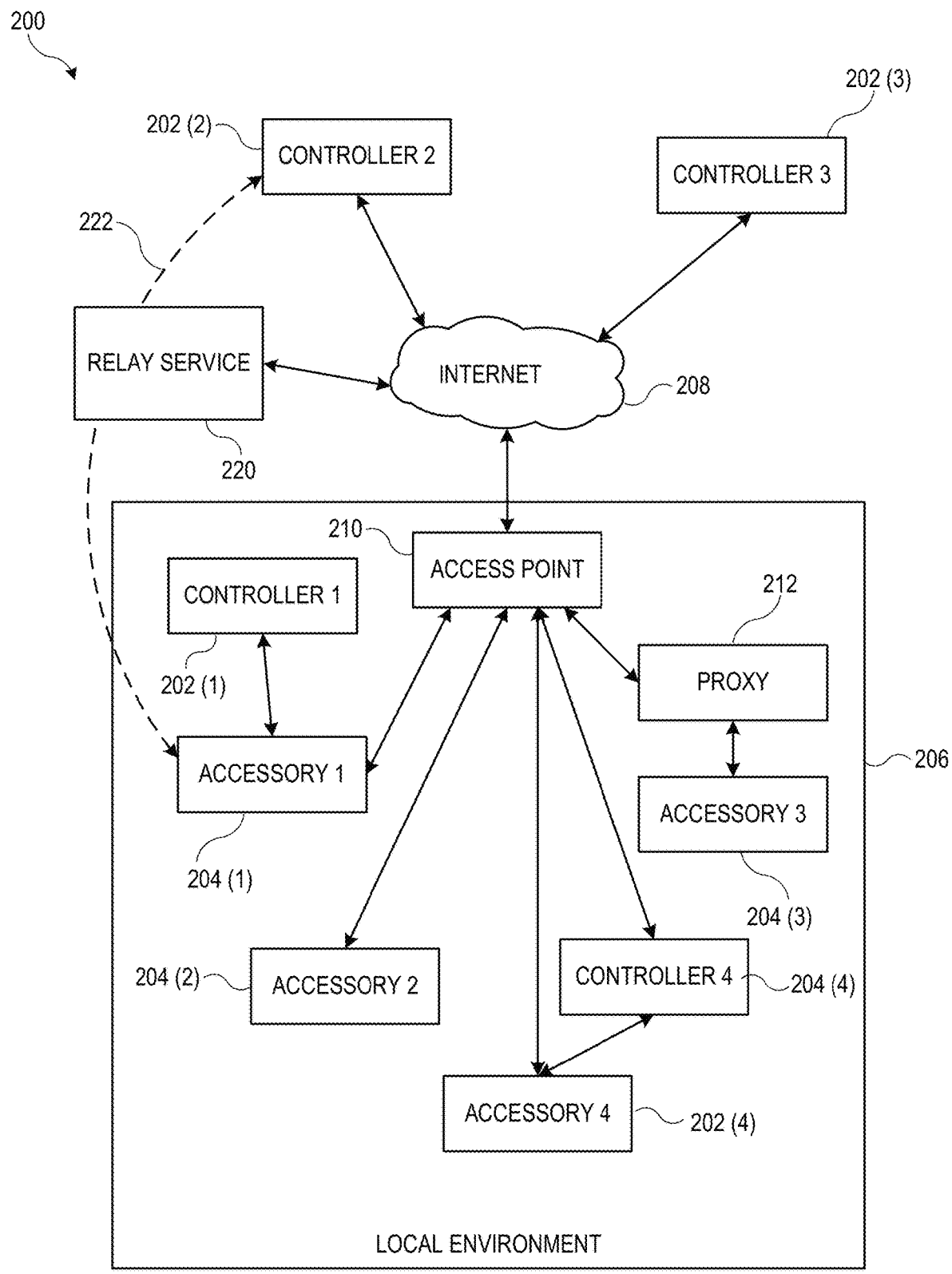
FIG. 2 illustrates a network configuration according to an embodiment of the present disclosure.

FIG. 2 shows a network configuration 200 according to an embodiment of the present disclosure. Configuration 200 allows controllers 202 to communicate with accessories 204 located in local environment 206 (e.g., a home environment such as environment 100 described above). Each controller 202 can be an electronic device owned and/or operated by a user who frequents environment 206 (e.g., a resident of a home or a regular visitor to the home). Controllers 202 can each be similar to controller 102 of FIG. 1, and accessories 204 can be similar to various accessories shown in FIG. 1.

In various embodiments, accessories 204 can each communicate with an access point 210 that can be located in local environment 206. Access point 210 can provide a local area network (LAN) to which accessories 204 and controllers 202 (when present in local environment 206) can connect. Any type of LAN technology can be used, including Wi-Fi networks or other wireless LAN technologies. Thus, access point 210 can facilitate communication between accessories 204 and controllers 202 within local environment 206. In some embodiments, a controller (e.g., controller 202(1)) that is present in local environment 206 can communicate directly with an accessory (e.g., accessory 204(1)). Bluetooth communication, ad hoc wireless networking, or other point-to-point communication technologies can be used as desired.

In some instances, an accessory might not communicate directly with access point 210 or with controllers 202. For example, accessory 204(3) can be connected to a proxy 212, and controllers 202 and/or access point 210 can communicate with accessory 204(3) via proxy 212. In various embodiments, proxy 212 can provide relaying of messages to and from accessory 204(3). Proxy 212 can implement communication security measures and/or protocol translation, and a single proxy 212 can interface to one or more accessories 204. In some embodiments, proxy 212 can be an "intelligent" device that can coordinate operations among multiple controllers and/or accessories and is not limited to passively relaying messages.

In some embodiments, accessories 204 and controllers 202 that are present in local environment 206 can communicate using a local area network (LAN), such as a Wi-Fi network and/or a point-to-point communication medium such as Bluetooth LE. It is to be understood that other communication transports and protocols can be used. In some embodiments, controllers 202 and accessories 204 (and proxy 212 if present) can support a uniform accessory protocol as described above that can be implemented using both Wi-Fi and Bluetooth LE as transports.

In the example of FIG. 2, controller 202(1) is currently located in local environment 206 with accessories 204 and access point 210. For example, controller 202(1) can be on the same LAN as accessories 204. Controllers 202(2) and 202(3) are currently located outside local environment 206 but are connected to a communication network 208 (e.g., the Internet); such controllers are said to be "remote" from accessories 204. It is to be understood that controllers 202 can be mobile devices that are sometimes within local environment 206 and sometimes outside local environment 206. Accessories 204 need not be mobile and need not be connected to communication network 208. In some embodiments, access point 210 can be connected to communication network 208 (e.g., access point 210 can be implemented as a conventional Wi-Fi access point or base station) and can permit remote access to accessories 204 by remote controllers 202(2) and 202(3).

However, it may not be desirable to configure each of accessories 204 as a wide-area network device that can be found and communicated with by any device able to connect to communication network 208. For instance, if communication network 208 is the Internet, a vast number of devices, including devices owned by anyone anywhere in the world, may be able to locate accessories 204 and attempt operations for which they are not authorized. Thus, to more selectively allow controllers 202 to communicate with accessories 204 via network 208, it may be useful to employ a relay service 220.

According to various embodiments of the present disclosure, relay service 220 can facilitate communication between controllers 202 (in particular remote controllers 202(2), 202(3)) and accessories 204 via communication network 208. For example, relay service 220 can establish a persistent connection to accessory 204(1), in which accessory 204(1) is identified by a persistent accessory alias (also referred to as an "accessory relay alias," or "accessory RA") that is assigned by relay service 220 and known to controllers 202 (but presumably not to other devices that are not authorized to access accessories 204). Controller 202(2) can send a request to relay service 220 to deliver a message to accessory 204(1); the request can include the message content, the accessory alias assigned to accessory 204(1) by relay service 220, and additional information (e.g., an access token as described below) usable by relay service 220 to verify that controller 202(2) is authorized to communicate with accessory 204(1). Relay service 220 can deliver the message to accessory 204(1). Response messages from accessory 204(1) can be delivered to controller 202(2) in a similar manner, using a persistent operator alias (also referred to as an "operator relay alias," or "operator RA") that is assigned to controller 202(2) by relay service 220 and known to accessory 204(1) but presumably not to devices that are not authorized to use relay service 220 to communicate with controller 202(2). The message content exchanged between controller 202(2) and accessory 204(1) via relay service 220 can conform to a uniform accessory protocol as described above, and message content can be opaque to relay service 220. Accordingly, controller 202(2) and accessory 204(1) can communicate via relay service 220 to establish a pair-verified session (as defined above) and can encrypt message content such that the message content is not readable by relay service 220 or any other intermediary through which the message content may pass. In this manner, relay service 220 can provide a secure end-to-end communication path (indicated by dashed line 222) between controller 202(2) and accessory 204(1) (or between any controller 202 and any accessory 204).

In some embodiments, controllers 202 can be configured to communicate with accessories 204 without using relay server 220 when possible. For example, when controller 202(2) determines that it should send a message to accessory 204(1) (e.g., based on user input or a received notification as described below), a communication daemon or other process executing in controller 202(2) can determine whether "local access" (or a "local channel") to accessory 204(1) is currently available. For instance, controller 202(2) can actively or passively scan for the presence of accessory 204(1) on a local network or point-to-point communication technology; if accessory 204(1) is detected, then local access is possible. If accessory 204(1) is not detected, then local access is not available and controller 202(2) can communicate with relay service 220 instead. The determination whether to use local access or relay service 220 can be transparent to the user and can be made each time a communication channel to the accessory is to be established. Thus, a user who wants to interact with accessory 204(1) using controller 202(2) can simply do so without worrying about whether to use local access or remote access via relay service 220.

In some embodiments, controller 204 (4) can be a proprietary controller device programmed to control one or more accessory 202 (4). The controller 204(4) can be added to the network with procedures similar for adding other accessories to the network. In some embodiments, the controller 204(4) can operate in the local environment and control accessory 204(1), 204(2), and 204(3) through an access point 210. In some embodiments, the proprietary accessory 202(4) can be controlled by controllers 202(2) and 202(3) from outside the local environment.

It will be appreciated that network configuration 200 is illustrative and that variations and modifications are possible. Any number of controllers and any number of accessories can be included in a network configuration. In some embodiments, the network configuration can include one or more proxies (e.g., bridges, tunnels, coordinators). Some or all of accessories 204 may be accessible only within the local environment. Further, as described below, different controllers 202 may have different levels of permission in regard to accessing accessories 204; for instance, remote access via network 208 may be permitted for some controllers 202 but not for other controllers 202.

III. Secure Frame Management

Figure 3:
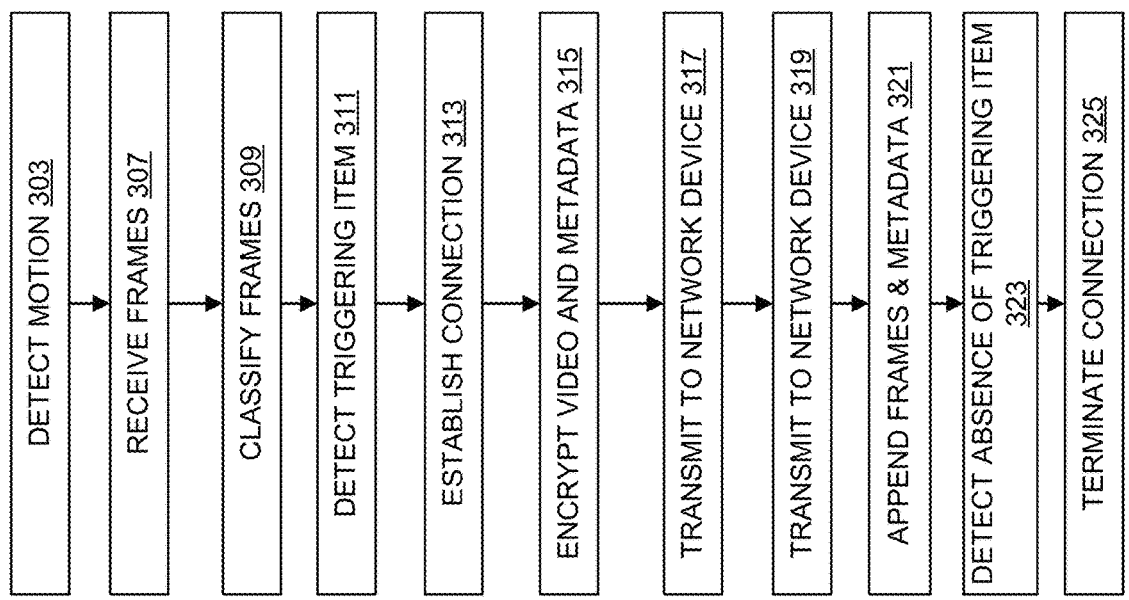
FIG. 3 illustrates a simplified process for secure frame management according to an embodiment of the present disclosure.
Figure 3:
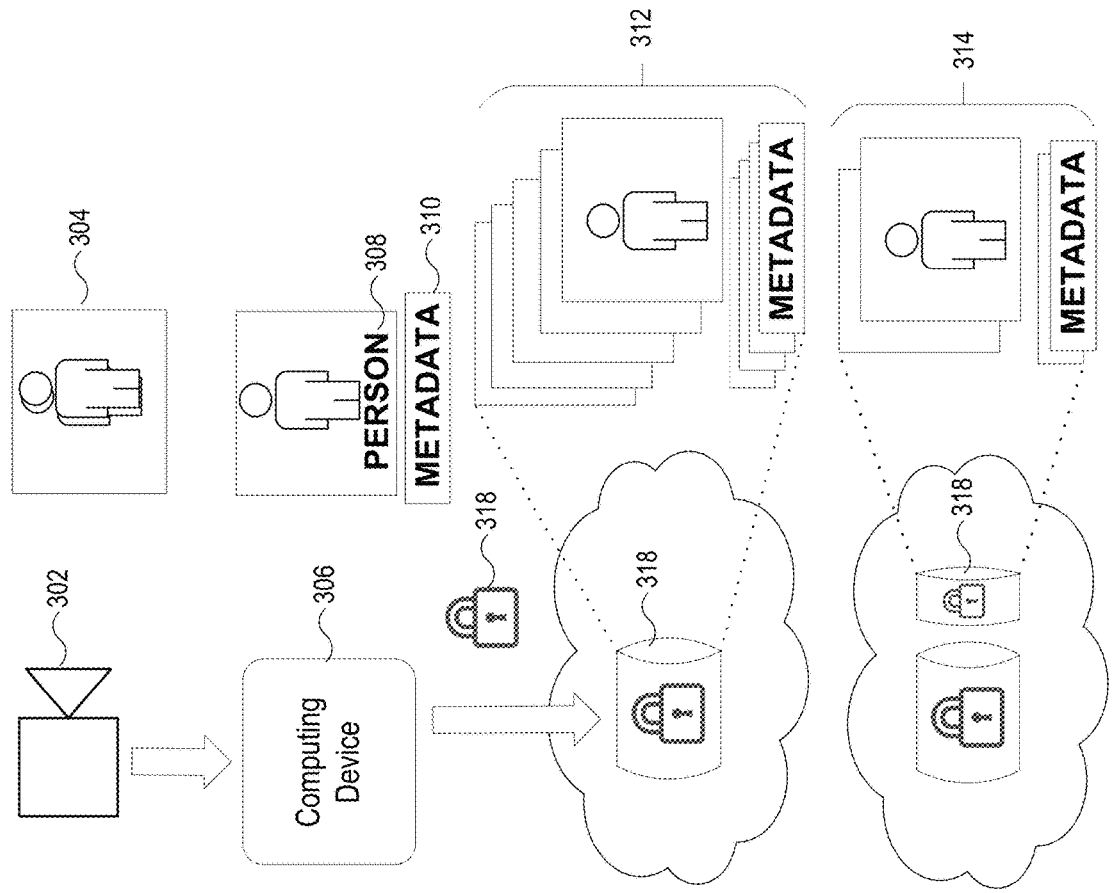

FIG. 3 illustrates a simplified process for secure frame management according to an embodiment of the present disclosure. In various embodiments, an Internet Protocol camera 302 can detect motion, at 303. The camera 302 can employ any number of techniques for detecting motion. In some embodiments, the camera 302 can detect a lighting difference in the detected image. The principal methods by which motion can be electronically identified are optical detection and acoustic detection. Infrared light or laser technology may be used for optical detection. Motion detection devices, such as passive infrared (PIR) motion detectors, have a sensor that detects a disturbance in the infrared spectrum. A simple algorithm for motion detection by a fixed camera compares the current image with a reference image and simply counts the number of different pixels. Since images will naturally differ due to factors such as varying lighting, camera flicker, and charge-coupled device (CCD) dark currents, pre-processing can be useful to reduce the number of false positive alarms.

Once detected, a signal can activate the camera that can capture an image or video data. In some embodiments, the detection of motion can trigger the camera to capture a frame 304 of the video stream and transfer the frame 304 over a network to the computing device 306.

The computing device 306 can receive, at 307, the frame 304 and process the frame using any one of a number of image recognition techniques. The computing device 306 can classify, at 309, the frame 304 by at least comparing one or more aspects of the frame 304 of the video stream from the camera 302 against one or more criteria. In some embodiments, the frame 304 can be classified as a person, an animal or a vehicle.

Image recognition refers to technologies that identify places, logos, people, objects, buildings, and several other variables in images. Classification is pattern matching with data. Images are data in the form of 2-dimensional matrices. In fact, image recognition is classifying data into one category out of many. The major steps in image recognition process are gather and organize data, build a predictive model and use it to recognize images.

The human eye perceives an image as a set of signals which are processed by the visual cortex in the brain. This results in a vivid experience of a scene, associated with concepts and objects recorded in one's memory. Image recognition tries to mimic this process. Computer perceives an image as either a raster or a vector image. Raster images are a sequence of pixels with discrete numerical values for colors while vector images are a set of color-annotated polygons.

To analyze images the geometric encoding is transformed into constructs depicting physical features and objects. These constructs can then be logically analyzed by the computer. Organizing data involves classification and feature extraction. The first step in image classification is to simplify the image by extracting important information and leaving out the rest. For example, if you want to extract the image of a person from the background you will notice a significant variation in red-green-blue (RGB) pixel values.

However, by running an edge detector on the image the computing system can simplify it. The computing system can easily discern the circular shape of the face and eyes in these edge images and so edge detection retains the essential information while throwing away non-essential information. Some well-known feature descriptor techniques are Haar-like features introduced by Viola and Jones, Histogram of Oriented Gradients (HOG), Scale-Invariant Feature Transform (SIFT), Speeded Up Robust Feature (SURF) etc.

Before a classification algorithm can properly identify the image, the computing system is trained by showing thousands of person and non-person images. The general principle in machine learning algorithms is to treat feature vectors as points in higher dimensional space. Then the computing system tries to find planes or surfaces (contours) that separate higher dimensional space in a way that all examples from a particular class are on one side of the plane or surface.

To build a predictive model the computing system can utilize a neural networks. The neural network is a system of hardware and software used to estimate functions that depend on the huge amount of unknown inputs. A neural network is an interconnected group of nodes. Each processing node has its own small sphere of knowledge, including what it has seen and any rules it was originally programmed with or developed for itself. The neural network would require one learning algorithm. There are numerous algorithms for image classification in recognizing images such as bag-of-words, support vector machines (SVM), face landmark estimation (for face recognition), K-nearest neighbors (KNN), logistic regression etc.

The image data, both training, and test are organized. Training data is different from test data, which also means removing duplicates (or near duplicates) between them. This data is fed into the model to recognize images. The computing system finds the image of a person in the database of known images which has the closest measurements to the test image. The classifier needs to be trained by taking measurements from a new test image and tells the system about the closest match with a person. Running this classifier can take milliseconds. The result of the classifier can be person, vehicle or animal.

In various embodiments, if the classifier identifies the frame 304 as an item of interest, a socket can be opened between the camera 302 and the computing device 306 to stream fragments of video data (e.g., mp4 video). In various embodiments, the video data is encrypted at the camera 302. The computing device 306 can decrypt the video data.

The computing device 306 can review each from of the one or more frames of the video stream for a triggering item. A triggering item can be an image of a person. The detection of the triggering item, at 311, in at least one frame of the one or more frames of the video stream, can trigger the processor to initiate the video collection process.

In various embodiments, the computing device is already connected with a network computing device. In some embodiments in which the connection does not already exist, the detection of the triggering item can result in the computing device establishing a connection with the network computing device.

In various embodiments, the computing device 306 can encrypt, at 315, the one or more frames of video stream and accompanying metadata 312. In some embodiments, the metadata 310 can be the start position and the end position of the one or more frames 304 of the video stream. In some embodiments, the metadata 310 indicates the duration of the one or more frames of video stream. In some embodiments the encryption is performed using a 128-bit encryption or a 256-bit encryption key.

In various embodiments, the computing device 306 can transmit, at 317, over the network connection, the one or more frames of the video stream and the accompanying metadata 312. The network computing device can be configured to store the encrypted one or more frames of the video stream and the encrypted accompanying metadata 312 in a container 318.

In various embodiments, as long as the computing device detects the triggering item, the computing can receive on or more frames of the video stream and subsequent metadata. The computing device can encrypt the one or more subsequent frames of the video stream and subsequent metadata 314. The computing device 306 can transmit, at 319, to the network computing device over the connection, the encrypted one or more subsequent frames of the video stream and the encrypted subsequent metadata 314. The network computing device can append, at 321, the one or more encrypted subsequent frames of the video stream onto the one or more frames of the video stream and to store the encrypted subsequent metadata in the container 318.

In accordance with detection, at 323, of an absence of the triggering item in at least one subsequent frame of the one or more subsequent frames of the video stream, the computing device 306 can terminate, at 325, the connection with the network computing device.

Figure 4:
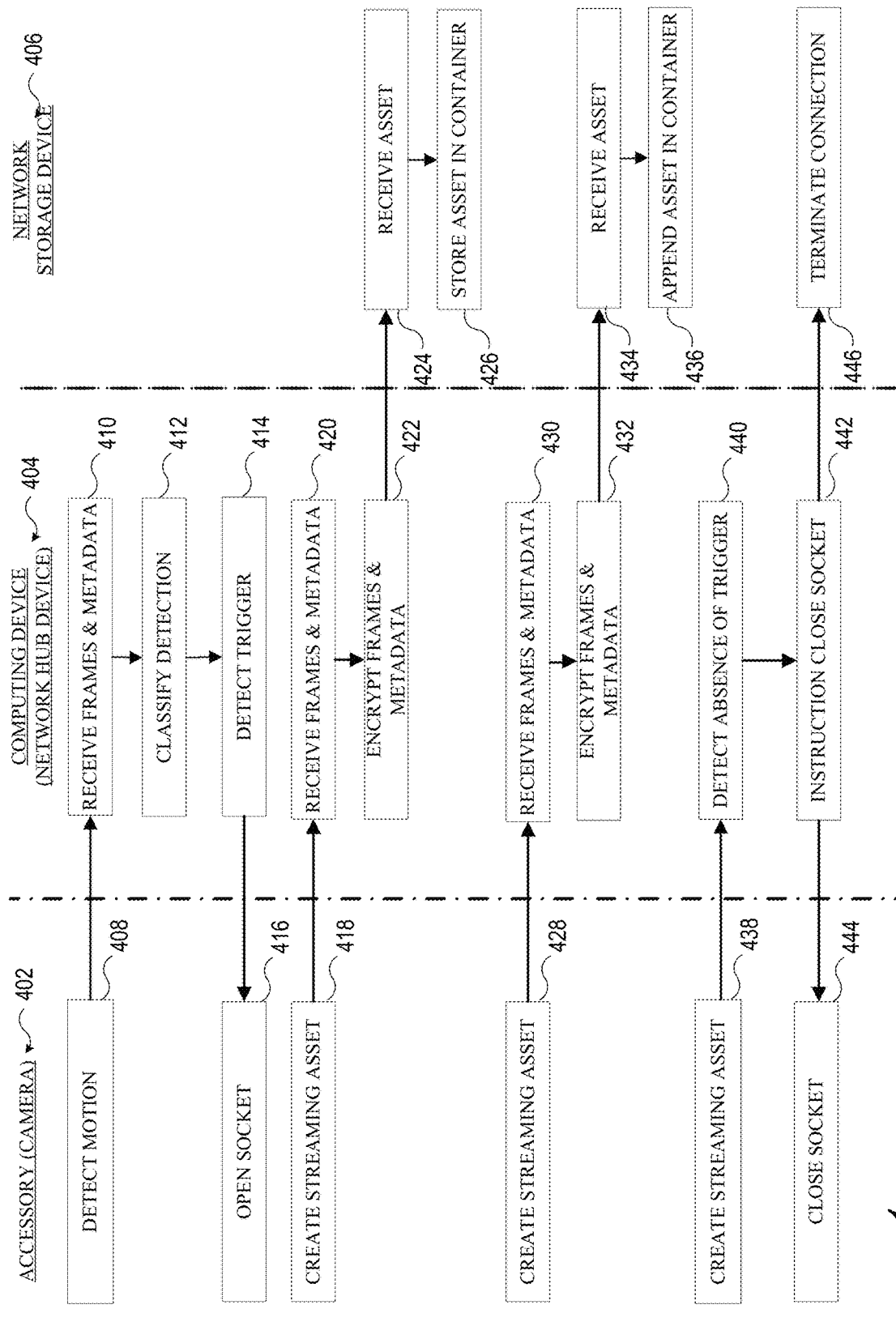
FIG. 4 illustrates a simplified flow diagram for a technique for secure frame management according to an embodiment of the present disclosure.

FIG. 4 illustrates a swim lane diagram for a network 400 for a technique for authorizing universal devices according to an embodiment of the present disclosure. FIG. 4 illustrates three primary hardware components used for the discloses technique. A camera 402 (e.g., an Internet Protocol (IP) camera) can be used to capture the one or more frames of still or streaming video images. An IP camera, is a type of digital video camera that receives control data and sends image data via the Internet. IP cameras are commonly used for surveillance. Unlike analog closed-circuit television (CCTV) cameras, IP cameras require no local recording device, but only a local area network. Most IP cameras are webcams, but the term IP camera or netcam usually applies only to those used for surveillance that can be directly accessed over a network connection. While one camera 402 is depicted, the disclosed techniques can use multiple IP cameras connected to the network.

Next, a computing device 404 is used to receive and process the one or more frames of video data received from the camera 402. In some embodiments, the computing device 404 can be a special purpose computer such as a media access device (e.g., an Apple TV) that can be used for displaying video content to a user on a display. The computing device can send and receive data wirelessly and can include one or more processors and/or a graphics processor. The computing device 404 can control a home network of accessories (e.g., door locks, lights, cameras, thermostats, etc.) The camera 402 can be linked to the computing device 404 using a network protocol as an accessory. Further details on the computing device 404 is provided below.

Finally, a storage device 406 is used to receive and store video data from the camera 402 as processed by the computing device 404. The storage device 406 can be cloud-based by using a series of remote servers and databases.

In various embodiments, the camera 402 can detect motion, at 408, through any one of the techniques previously discussed. Upon detection of motion 408, the camera 402 can transmit a message via the network to the computing device 404 indicating the detection of motion 408. The camera can send one or more frames of a streaming media data and associated metadata to the computing device 404 over the network. The computing device 404 can receive the frames and associated metadata, at 410, from the camera 402. The computing device 404 can classify the detection, at 412, using various classification algorithms and techniques. In various embodiments, the computing device 404 can classify the one or more frames of streaming video as a person, an animal, or a vehicle. In various embodiments, other detections of motion (e.g., a branch waving in the wind or motion of a flag) can be ignored by the system thereby reducing the number of false detections and reducing the quantity of transmitted and stored video data.

The computing device 404 can detect a trigger, at 414, contained within the one or more frames of video data. In some embodiments, the trigger can be an image of a person within the one or more frames of video data. In various embodiments, the trigger can be an image of a vehicle in the one or more frames of video data. In other embodiments, the trigger can be an image of an animal in one or more frames of video data. The trigger can also be combination of the various triggers (e.g., person and animal or person and vehicle). The trigger can also be specific objects that meet some predefined characteristics (e.g., a package). In some embodiments the computing device 404 can receive 15 frames per second. The computing device 404 can review a select number of frames (e.g., every Nth frame) where N is an integer greater than one.

Upon detection of a trigger, the computing device 404 can transmit instructions to the camera 402 to open a socket 416 for the camera to facilitate transfer of streaming video data. This process can be called starting a new clip session. The camera 402 can create a streaming asset 418 comprised of video image frame, audio data, and associated metadata. The streaming asset can be a fragment of the video stream (e.g., a four second fragment). The streaming asset 418 can be transmitted to the computing device via the socket. The computing device 404 can receive, at 420 the video frames and associated metadata. In various embodiments, the video frames and associated metadata may be encrypted by the camera 402. For encrypted streaming data, the computing device 404 can decrypt the data prior to processing. By processing the data on the computing device 404 instead of processing the data on the cloud storage the privacy of the data is maintained. In this way, the cloud cannot access the data without the private key from the computing device or accounts granted access from the computing device.

In some embodiments, streaming asset can be stored in a persistent memory of the computing device 404. In some embodiments, the streaming asset is received as a series of packets of video data and associated metadata. In some embodiments the computing device 404 can combine the series of packets of video data into one or more larger files of video data.

In various embodiments, the computing device 404 can encrypt, at 422, the streaming asset and associated metadata using advanced encryption techniques (e.g., 256 bit encryption). The computing device 404 can use a symmetric key to encode the data. A 256-bit key can have $2^{256}$ possible combinations. With so many possible combinations, such encryption would be extremely difficult to defeat in any reasonable timeframe even with a supercomputer.

The encrypted frames and metadata can be transmitted to the storage device 406. The encrypted frames and metadata can be stored in a storage device 406 (e.g., iCloud) as a new type of asset called a streaming asset. In accordance with the disclosure the streaming asset can be mutable because it can be appended to on the storage device 406. The storage device 406 can receive, at 424, the digital asset including encrypted video frames and associated metadata. In the storage device 406, the encrypted data can be stored, at 426, in a container.

The camera 402 will continue to create, at 428, additional streaming assets including video image frames and associated metadata as long as the trigger is detected in one or more frames of the video data. The additional streaming assets can be transmitted to the computing device 404. The computing device 404 can receive, at 430, the additional streaming asset and associated metadata. In various embodiments, the additional video frames and associated metadata may be encrypted by the camera 402. For encrypted additional streaming data, the computing device can decrypt the data prior to processing.

In some embodiments, additional streaming asset can be stored in a persistent memory of the computing device 404. In some embodiments, the additional streaming asset can be received as a series of packets of video data and associated metadata. In some embodiments the computing device 404 can combine the series of packets of video data into one or more larger files of video data.

In various embodiments, the computing device 404 can encrypt, at 432, the additional streaming asset and associated metadata using advanced encryption techniques (e.g., 256 bit encryption). The computing device 404 can transmit the encrypted additional streaming data and associated metadata to the storage device 406. The storage device 406 can receive, at 434, the asset and can append the assets and associated metadata, at 436, already stored in the container. By appending the asset and associated metadata stored in the container the combined asset can be played as a single video file.

The camera 402 can continue to collect one of more frames of video data to create, at 438, a streaming asset. The camera 402 can transmit the streaming data to the computing device 404 over a network. The computing device 404 can receive the one or more frames of video from the camera 402. Upon detection of the absence of the triggering item, at 440, the computing device 404 can transmit an instruction to close the socket, at 442. The camera 402 can receive the instruction from the computing device 404 and close the socket at 444. The computing device can transmit instructions to the storage device 406 to terminate, at 446, the connection with the computing device 406.

In various embodiments, the one or more frames of the video stream can include a fragment of live video stream data from the camera 402.

The computing device 404 can be configured to play the one or more frames of the video stream using an HTTP-based adaptive bitrate streaming communication protocol. In this way a collection of frames of video data stored in a container in the storage device 406 can be replayed by the computing device 404 or a different computing device. Dynamic Adaptive Streaming over HTTP (DASH), also known as MPEG-DASH, is an adaptive bitrate streaming technique that enables high quality streaming of media content over the Internet delivered from conventional HTTP web servers. Similar to Apple's HTTP Live Streaming (HLS) solution, MPEG-DASH works by breaking the content into a sequence of small HTTP-based file segments, each segment containing a short interval of playback time of content that is potentially many hours in duration, such as a movie or the live broadcast of a sports event. The content is made available at a variety of different bit rates, i.e., alternative segments encoded at different bit rates covering aligned short intervals of playback time. While the content is being played back by an MPEG-DASH client, the client automatically selects from the alternatives the next segment to download and play based on current network conditions. The client automatically selects the segment with the highest bit rate possible that can be downloaded in time for playback without causing stalls or re-buffering events in the playback. Thus, an MPEG-DASH client can seamlessly adapt to changing network conditions and provide high quality playback with fewer stalls or re-buffering events. MPEG-DASH is the first adaptive bit-rate HTTP-based streaming solution that is an international standard. The metadata can inform the HTTP web servers the beginning and end of the video file.

The techniques can use HomeKit Secure Video features using HLS for playback. HTTP Live Streaming provides a reliable, cost-effective means of delivering continuous and long-form video over the Internet. HTTP Live Streaming can allow a receiver to adapt the bit rate of the media to the current network conditions in order to maintain uninterrupted playback at the best possible quality. HTTP Live Streaming can support interstitial content boundaries. HTTP Live Streaming can provide a flexible framework for media encryption. HTTP Live Streaming can efficiently offer multiple renditions of the same content, such as audio translations. HTTP Live Streaming offers compatibility with large-scale HTTP caching infrastructure to support delivery to large audiences.

The camera 402 can sends digital multimedia files containing video and audio (e.g., fragmented MPEG-4 fmp4) media segments with both audio and video assets 418, 428, 438 to computing device 404. Computing device 404 can run a computer vision model on the fmp4 media segment to check if there is a person, animal or vehicle. Once trigger is detected 414 computing device 404 upload the fmp4 media segment along with metadata to network storage device 406. Controller 102 uses the metadata stored in network storage device 406 and uniform resource locators (URLs) to fmp4 media segments stored in network storage device 406 to create a HLS playlist. HLS playlist is fed to a media player to do the playback.

MPEG-4 Fragments are specified by the ISO Base Media File Format (ISOBMFF). Unlike regular MPEG-4 files that have a Movie Box ("moov") that contains sample tables and a Media Data Box ("mdat") containing the corresponding samples, an MPEG-4 Fragment consists of a Movie Fragment Box ("moof") containing a subset of the sample table and a Media Data Box containing those samples. Use of MPEG-4 Fragments does require a Movie Box for initialization, but that Movie Box contains only non-sample-specific information such as track and sample descriptions. A Fragmented MPEG-4 (fMP4) Segment is a "segment" as defined by Section 3 of ISOBMFF, including the constraints on Media Data Boxes in Section 8.16 of ISOBMFF. The Media Initialization Section for an fMP4 Segment is an ISO Base Media File that can initialize a parser for that Segment.

In various embodiments, the computing device 404 is not using the standard HTTP Live Streaming (HLS) 128 bit key. The computing device 404 can use 256 bit encryption. In addition, the way the computing device 404 packs the data is slightly different because the system is using AS256 Galois Counter Mode (GCM) format that includes a verification or authentication tag. The authentication tag validates the authenticity by verify a checksum to ensure the data file is intact prior to playing it.

The technique can include providing instructions to a second computing device to balance a load between the computing device and the second computing device. The technique can include performing balancing operations between one or more processors for a load of the one or more frames of the video stream being received from the camera. The balancing operations can include reassigning operations to a second computing device based at least in part on bandwidth of the one or more processors of the computing device and network bandwidth. The techniques can also include assigning access control of a specific camera to a user outside a primary network. The standard HTTP Live Streaming (HLS) 128 bit key was found to be sufficient for commercial movie content, but 256 bit key encryptions provides stronger protection for a user's personal data for privacy reasons.

The processing and analysis of video data, especially from multiple cameras, is computing resource intensive. If a media access device (e.g., an Apple TV) is displaying 4K video content such content could be degraded if a resource balancing routine was not implemented. The home network system can incorporate multiple computing device hubs (e.g., multiple media access devices, multiple home hub devices, or multiple tablet computers) to balance the computing resources to handle both the entertainment processes and the camera image processing. In home networks, a computing device 404 can be designated as the primary hub. The primary hub is responsible for providing commands to the other devices and accessories. In a mesh network, if Bluetooth accessories that are out of range from the primary, the primary or master can command the other devices or hubs to provide control commands as proxies. In these cases, the primary hub can delegate responsibilities for control of other accessories to subordinate computing devices. Therefore, the processing capabilities can be shared over several different computing device hubs.

Another solution to address the processing challenges, is dynamic rebalancing. In dynamic rebalancing the stream can by dynamically reconfigured from one resolution (e.g., 1080p) to a second resolution (720p) to address limited processing power limitations. In this way, using resource balancing, the entertainment content is not lost and the camera image analysis can still be performed.

Improved access controls allow a homeowner to grant access to only specific cameras 402. In various embodiments, each camera 402 is assigned to an independent zone in the storage container routine (e.g., Cloudkit). The improved access controls allow a user to share the entire zone and add participants to that zone. For example, a zone can be used for camera A. The homeowner can decide who is a part of that zone. In this way, a second user can be granted access to some zones (e.g., external cameras) and denied access to other cameras (e.g., internal cameras).

In addition, access to the data shared on the cloud can be modified. The computing device 404 encrypts the video data and metadata with a key specific to the cloud account for the device owner. In this way, the user can access the video data from any one of the devices (e.g., tablet, smartphone, portable computing device, media access device, etc.) associated with the cloud account. The cloud storage service does not contain the keys to decrypt the video stored in the cloud. However, other family members may be interested in obtaining the data without using the same cloud account. For example, a husband can use his cloud account to establish the network and use his cloud account to secure the data. Without any modifications, the wife, who uses a separate cloud account, would not have access to the video data (e.g., front door video). Improvements allow for sharing of the streaming media data between other uses with different cloud accounts. The owner of the camera can also grant permission to view video clips to others (e.g., a roommate) to access data for one or more cameras. The owner of the data can decide to generate a new key or roll the key which would prohibit previously granted access to the camera data unless the permission is shared again.

It will be appreciated that process 400 is illustrative and that variations and modifications are possible. Steps described as sequential may be executed in parallel, order of steps may be varied, and steps may be modified, combined, added or omitted.

Figure 5:
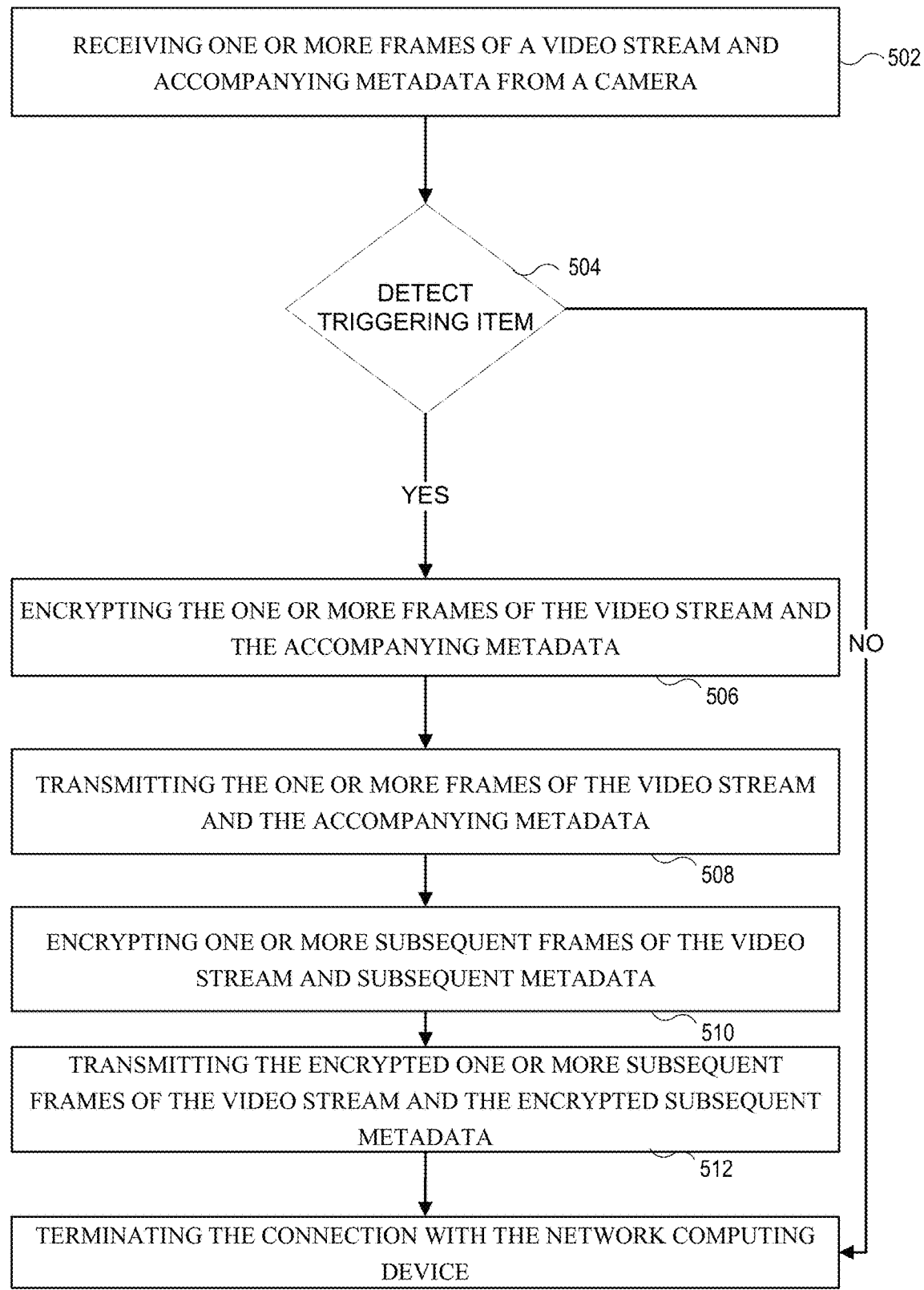
FIG. 5 illustrates a diagram for a technique for secure frame management according to an embodiment of the present disclosure.

FIG. 5 illustrates a simplified flow diagram for a technique for secure frame management. At 502, in response to detection of motion by a camera connected to a network, the technique can include receiving, by a computing device, one or more frames of a video stream and accompanying metadata from the camera. In some embodiments, the camera is an Internet Protocol camera. The network can be a local network or via the Internet.

In various embodiments, the technique can include classifying, by the computing device, the one or more frames of the video stream by at least comparing one or more aspects of the one or more frames of the video stream from the camera against one or more criteria. The criteria can include images or outlines of persons, animals, or vehicles stored in a memory of the device.

At 504, the technique can include reviewing, by the computing device, each frame of the one or more frames of the video stream for a triggering item. In accordance with detection of the triggering item in at least one frame of the one or more frames of the video stream establishing, by the computing device, a connection with a network computing device. The triggering item can include an image of a persons or person(s). The triggering item can be the image of a weapon. The triggering item can be the image of a vehicle or vehicle(s). The triggering item can be the image of an animal such as a cat or dog.

At 506, the technique can include encrypting, by the computing device, the one or more frames of the video stream and the accompanying metadata. In various embodiments, the technique can apply one of the Advanced Encryption Standards (AES) established by the U.S. National Institute of Standards and Technology (NIST). The key size for encryption can be 128, 192, or 256 bit key lengths.

At 508, the technique can include transmitting, to the network computing device over the connection, the one or more frames of the video stream and the accompanying metadata, the network computing device configured to store the encrypted one or more frames of the video stream and the encrypted accompanying metadata in a container.

At 510, the technique can include encrypting, by the computing device, one or more subsequent frames of the video stream and subsequent metadata.

At 512, the technique can include transmitting, to the network computing device over the connection, the encrypted one or more subsequent frames of the video stream and the encrypted subsequent metadata. The network computing device can be configured to append the one or more encrypted subsequent frames of the video stream onto the one or more frames of the video stream and to store the encrypted subsequent metadata in the container.

In accordance with detection of an absence of the triggering item in at least one subsequent frame of the one or more subsequent frames of the video stream, at 514, the technique can include terminating the connection with the network computing device.

It will be appreciated that process 500 is illustrative and that variations and modifications are possible. Steps described as sequential may be executed in parallel, order of steps may be varied, and steps may be modified, combined, added or omitted.

IV. Example Device Architectures

Figure 6:
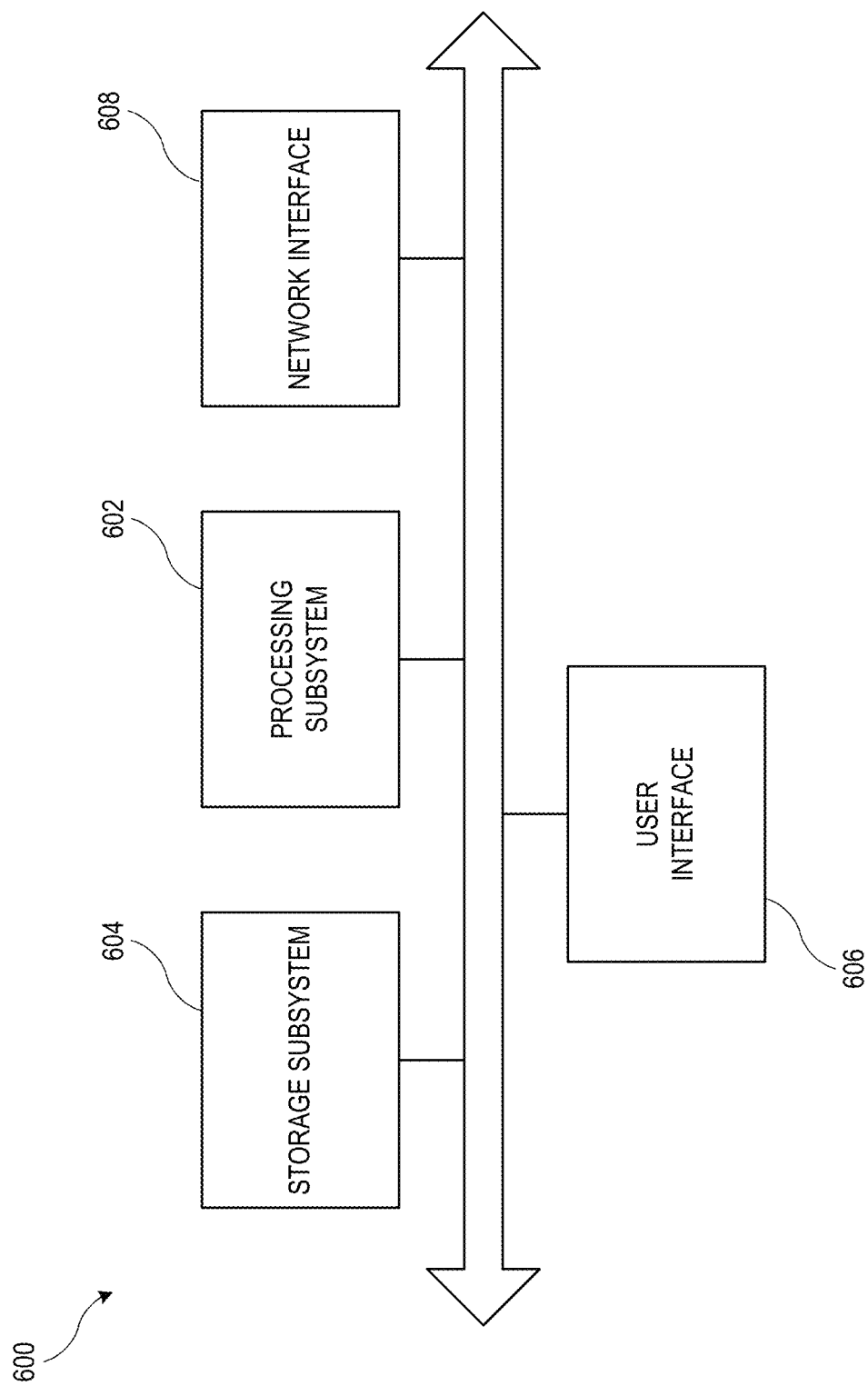
FIG. 6 illustrates a simplified block diagram of a computer system according to an embodiment of the present disclosure.

FIG. 6 shows a simplified block diagram of a computer system 600 according to an embodiment of the present disclosure. In some embodiments, computer system 600 can implement any or all of the functions, behaviors, and capabilities described herein as being performed by a server, as well as other functions, behaviors, and capabilities not expressly described. In some embodiments, other physical instances of computer system 600 can implement any or all of the functions, behaviors, and capabilities described herein as being performed by a controller or an accessory; further examples of controller and accessory implementations are described below. In some embodiments, the computer system can be a media access device.

Computer system 600 can include processing subsystem 602, storage subsystem 604, user interface 606, and network interface 608. Computer system 600 can also include other components (not explicitly shown) such as a power controllers, and other components operable to provide various enhanced capabilities. Computer system 600 can also be implemented in a large-scale architecture such as a scalable server system or server farm that can include many interconnected processors, storage systems and interfaces, capable of processing and responding to high volumes of requests from client devices including controllers and/or accessories.

Storage subsystem 604 can be implemented, e.g., using disk, flash memory, or any other non-transitory storage medium, or a combination of media, and can include volatile and/or non-volatile storage media. In some embodiments, storage subsystem 604 can store one or more application and/or operating system programs to be executed by processing subsystem 602, including programs to implement any or all operations described herein as being performed by any of the servers of relay service 220, as shown in FIG. 2, as well as data associated with such operations In instances where computer system 600 implements a server, storage subsystem 604 can be implemented using network storage technologies and/or other technologies that can manage high-volume data access requests.

User interface 606 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). In some embodiments, a user can operate input devices of user interface 606 to invoke the functionality of computer system 600 and can view and/or hear output from computer system 600 via output devices of user interface 606. In instances where computer system 600 implements a server, user interface 606 can be remotely located with respect to processing subsystem 602 and/or storage subsystem 604.

Processing subsystem 602 can be implemented using one or more integrated circuits, e.g., one or more single-core or multi-core microprocessors or microcontrollers, examples of which are known in the art. In operation, processing subsystem 602 can control the operation of computer system 600. In various embodiments, processing subsystem 602 can execute a variety of programs in response to program code and can maintain multiple concurrently executing programs or processes. At any given time, some or all of the program code to be executed can be resident in processing subsystem 602 and/or in storage media such as storage subsystem 604.

Through suitable programming, processing subsystem 602 can provide various functionality for computer system 600. For example, where computer system 600 implements a server of relay service 220, as shown in FIG. 2, processing subsystem 602 can implement various processes (or portions thereof) described above as being implemented by any or all of certificate server, identity server, accessory courier server, controller courier serve, message passing server(s), pass server, and/or reporting server. Processing subsystem 602 can also execute other programs to control other functions of computer system 600, including programs that may be stored in storage subsystem 604.

Network communication interface 608 can provide voice and/or data communication capability for computer system 600. In some embodiments, network communication interface 608 can include radio frequency (RF) transceiver components for accessing wireless data networks (e.g., using data network technology such as 3G, 4G/LTE, IEEE 802.11 family standards (e.g., Wi-Fi network technology), or other mobile communication technologies, or any combination thereof), components for short-range wireless communication (e.g., using Bluetooth and/or Bluetooth LE standards, NFC, etc.), and/or other components. In some embodiments, network communication interface 608 can provide wired network connectivity (e.g., Ethernet) in addition to or instead of a wireless interface. Network communication interface 608 can be implemented using a combination of hardware (e.g., driver circuits, antennas, modulators/demodulators, encoders/decoders, and other analog and/or digital signal processing circuits) and software components. In some embodiments, network communication interface 608 can support multiple communication channels concurrently, using the same transport or different transports.

It will be appreciated that computer system 600 is illustrative and that variations and modifications are possible. Computer systems including servers, controller devices, and/or accessories can have functionality not described herein (e.g., a controller device may also provide voice communication via cellular telephone networks; ability to interact with the user to provide personal information, play games, access content via the wireless network and/or locally stored content; etc.), and implementations of these devices and servers can include components appropriate to such functionality.

Further, while a computer system is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Figure 7:
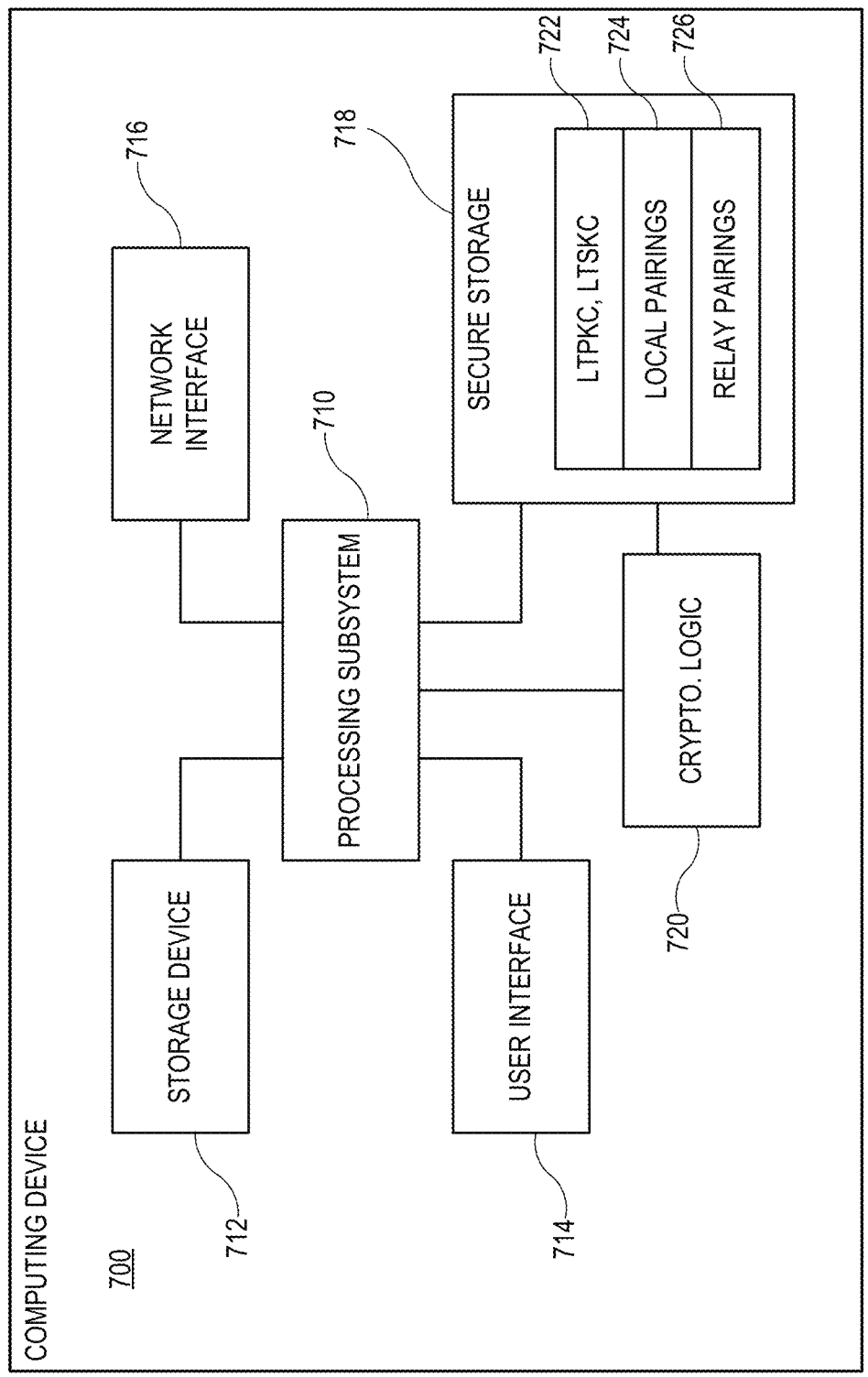
FIG. 7 illustrates a simplified block diagram of a computing device according to an embodiment of the present disclosure.

FIG. 7 shows a simplified block diagram of a computing device 700 according to an embodiment of the present disclosure. Computing device 700 can implement any or all of the computing device functions, behaviors, and capabilities described herein, as well as other functions, behaviors, and capabilities not expressly described. Computing device 700 can include processing subsystem 710, storage device 712, user interface 714, communication interface 716, secure storage module 718, and cryptographic logic module 720. Computing device 700 can also include other components (not explicitly shown) such as a power controllers, and other components operable to provide various enhanced capabilities.

Storage device 712 can be implemented, e.g., using disk, flash memory, or any other non-transitory storage medium, or a combination of media, and can include volatile and/or non-volatile media. In some embodiments, storage device 712 can store one or more application and/or operating system programs to be executed by processing subsystem 710, including programs to implement various operations described above as being performed by a computing device. Storage device 712 can also store program code executable to communicate with a relay service 220, as shown in FIG. 2, e.g., as described above. In some embodiments, portions (or all) of the computing device functionality described herein can be implemented in operating system programs rather than applications. In some embodiments, storage device 712 can also store apps designed for specific accessories or specific categories of accessories (e.g., an IP camera app to manage an IP camera accessory or a security app to interact with door lock accessories). In some embodiments, the storage device 712 can store digital multimedia content.

User interface 714 can include input devices such as a touch pad, touch screen, scroll wheel, click wheel, dial, button, switch, keypad, keyboard microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 714 to invoke the functionality of computing device 700 and can view and/or hear output from computing device 700 via output devices of user interface 714. In some embodiments, a user interface 714 can be a proprietary remote control. In some embodiments, a user interface 714, can be implemented as an App for a smartphone, tablet, wearable or other mobile electronic device.

Processing subsystem 710 can be implemented as one or more integrated circuits, e.g., one or more single-core or multi-core microprocessors or microcontrollers, examples of which are known in the art. In operation, processing system 710 can control the operation of computing device 700. In various embodiments, processing subsystem 710 can execute a variety of programs in response to program code and can maintain multiple concurrently executing programs or processes. At any given time, some or all of the program code to be executed can be resident in processing subsystem 710 and/or in storage media such as storage device 712.

Through suitable programming, processing subsystem 710 can provide various functionality for computing device 700. For example, in some embodiments, processing subsystem 710 can implement various processes (or portions thereof) described above as being implemented by a computing device. Processing subsystem 710 can also execute other programs to control other functions of computing device 700, including application programs that may be stored in storage device 712. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above, and can include communicating with the accessory via a relay service 220, as shown in FIG. 2, as described above.

Communication interface 716 can provide voice and/or data communication capability for computing device 700. In some embodiments communication interface 716 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 716 can provide wired network connectivity (e.g., Ethernet) in addition to or instead of a wireless interface. Communication interface 716 can be implemented using a combination of hardware (e.g., driver circuits, antennas, modulators/demodulators, encoders/decoders, and other analog and/or digital signal processing circuits) and software components. In some embodiments, communication interface 716 can support multiple communication channels concurrently or at different times, using the same transport or different transports. Thus, for example, computing device 700 can communicate with accessories via a local channel at some times and via a relay service 220, as shown in FIG. 2, at other times.

Secure storage module 718 can be an integrated circuit or the like that can securely store cryptographic information for computing device 700. Examples of information that can be stored within secure storage module 718 include the computing device's long-term public and secret keys 722 (LTPKC, LTSKC), a list of local pairings 724 (e.g., a lookup table that maps a local accessory identifier to an accessory long-term public key (LTPKA) for accessories that have completed a local pair setup or pair add process, e.g., as described above, with computing device 700), and a list of relay pairings 726 (e.g., accessory RAs and associated access tokens for accessories that have established a relay pairing, e.g., as described above, with computing device 700). In some embodiments, pairing information can be stored such that a local pairing 724 is mapped to the corresponding relay pairing 726 in instances where both a local pairing and a relay pairing with the accessory have been established.

In some embodiments, cryptographic operations can be implemented in a cryptographic logic module 720 that communicates with secure storage module 718. Physically, cryptographic logic module 720 can be implemented in the same integrated circuit with secure storage module 718 or a different integrated circuit (e.g., a processor in processing subsystem 710) as desired. Cryptographic logic module 720 can include various logic circuits (fixed or programmable as desired) that implement or support cryptographic operations of computing device 700, including any or all cryptographic operations described above. Secure storage module 718 and/or cryptographic logic module 720 can appear as a "black box" to the rest of computing device 700. Thus, for instance, communication interface 716 can receive a message in encrypted form that it cannot decrypt and can simply deliver the message to processing subsystem 710. Processing subsystem 710 may also be unable to decrypt the message, but it can recognize the message as encrypted and deliver it to cryptographic logic module 720. Cryptographic logic module 720 can decrypt the message (e.g., using information extracted from secure storage module 718) and determine what information to return to processing subsystem 710. As a result, certain information can be available only within secure storage module 718 and cryptographic logic module 720. If secure storage module 718 and cryptographic logic module 720 are implemented on a single integrated circuit that executes code only from an internal secure repository, this can make extraction of the information extremely difficult, which can provide a high degree of security. Other implementations are also possible.

Figure 8:
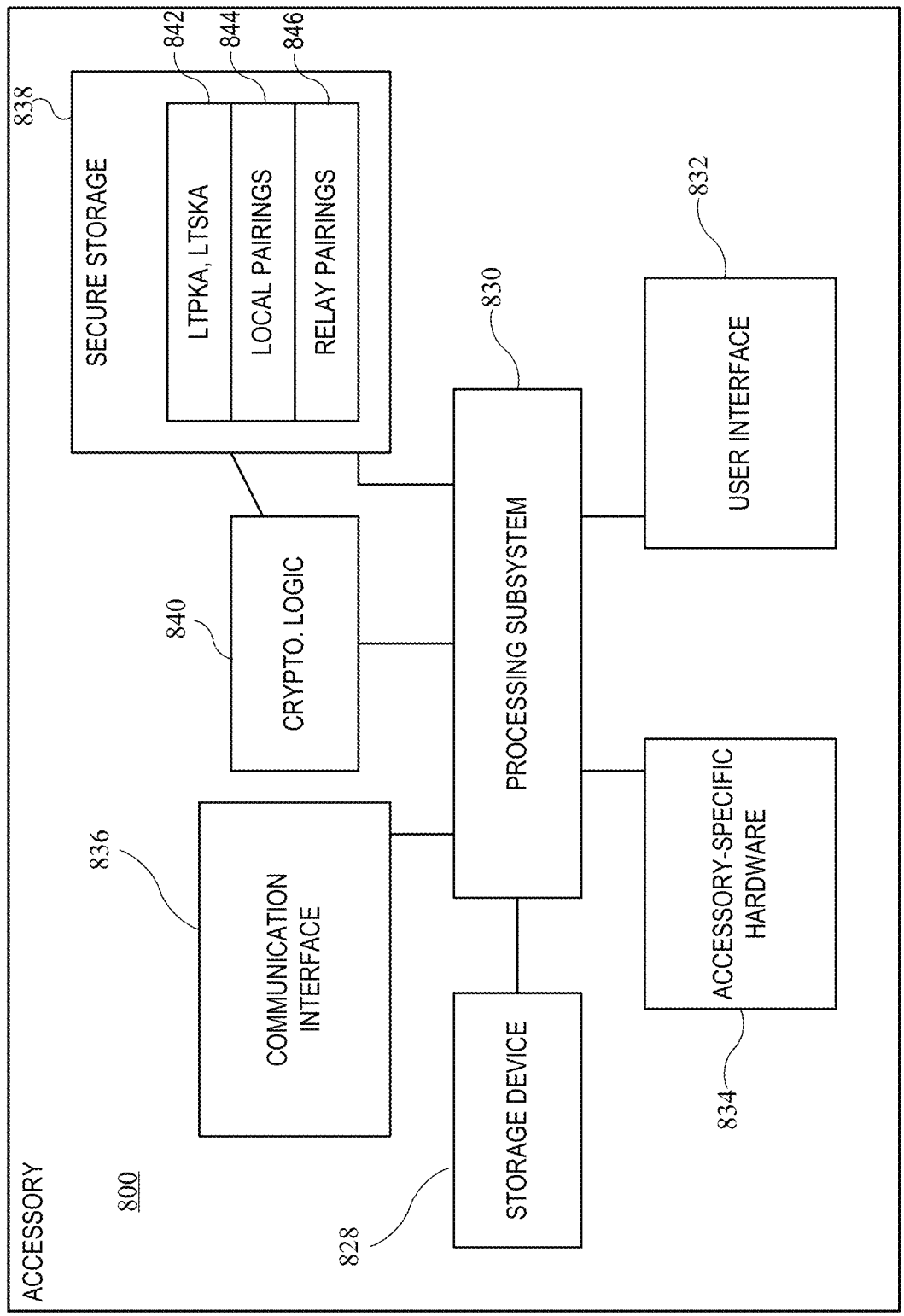
FIG. 8 illustrates a simplified block diagram of an accessory according to an embodiment of the present disclosure.

FIG. 8 shows a simplified block diagram of an accessory 800 according to an embodiment of the present disclosure. Accessory 800 can implement any or all of the accessory functions, behaviors, and capabilities described herein, as well as other functions, behaviors, and capabilities not expressly described. Accessory 800 can include storage device 828, processing subsystem 830, user interface 832, accessory-specific hardware 834, communication interface 836, secure storage module 838, and cryptographic logic module 840. Accessory 800 can also include other components (not explicitly shown) such as a battery, power computing devices, and other components operable to provide various enhanced capabilities.

Accessory 800 is representative of a broad class of accessories that can be operated by a computing device such as controller, and such accessories can vary widely in capability, complexity, and form factor. Various accessories may include components not explicitly shown in FIG. 8, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 828 can be implemented, e.g., using disk, flash memory, or any other non-transitory storage medium, or a combination of media, and can include volatile and/or non-volatile media. In some embodiments, storage device 828 can store one or more programs (e.g., firmware) to be executed by processing subsystem 830, including programs to implement various operations described above as being performed by an accessory, as well as operations related to particular accessory behaviors. Storage device 828 can also store an accessory object or accessory definition record that can be furnished to controller devices, e.g., during device discovery. Storage device 828 can also store accessory state information and any other data that may be used during operation of accessory 800. Storage device 828 can also store program code executable to communicate with a relay service 220, as shown in FIG. 2, e.g., as described above.

Processing subsystem 830 can include, e.g., one or more single-core or multi-core microprocessors and/or microcontrollers executing program code to perform various functions associated with accessory 800. For example, processing subsystem 830 can implement various processes (or portions thereof) described above as being implemented by an accessory, e.g., by executing program code stored in storage device 828. Processing subsystem 830 can also execute other programs to control other functions of accessory 800. In some instances programs executed by processing subsystem 830 can interact with a controller (e.g., controller), e.g., by generating messages to be sent to the controller and/or receiving messages from the controller. In some instances, the messages can be sent and/or received using a relay service 220, as shown in FIG. 2, as described above.

User interface 832 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 800, a user can operate input devices of user interface 832 to invoke functionality of accessory 800 and can view and/or hear output from accessory 800 via output devices of user interface 832. Some accessories may provide a minimal or no user interface. Where the accessory does not have a user interface, a user can still interact with the accessory using a controller (e.g., controller 1200).

Accessory-specific hardware 834 can include any other components that may be present in accessory 800 to enable its functionality. For example, in various embodiments accessory-specific hardware 834 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of accessory functionality can be supported by providing appropriate accessory-specific hardware 834 and that accessory-specific hardware can include mechanical as well as electrical or electronic components.

Communication interface 836 can provide voice and/or data communication capability for accessory 800. In some embodiments communication interface 836 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 836 can provide wired network connectivity (e.g., Ethernet) in addition to or instead of a wireless interface. Communication interface 836 can be implemented using a combination of hardware (e.g., driver circuits, antennas, modulators/demodulators, encoders/decoders, and other analog and/or digital signal processing circuits) and software components. In some embodiments, communication interface 836 can support multiple communication channels concurrently or at different times, using the same transport or different transports. Thus, for example, accessory 800 can communicate with a controller via a local channel at some times and via a relay service 220, as shown in FIG. 2, at other times.

Secure storage module 838 can be an integrated circuit or the like that can securely store cryptographic information for accessory 800. Examples of information that can be stored within secure storage module 838 include the accessory's long-term public and secret keys 842 (LTPKA, LTSKA), a list of local pairings 844 (e.g., a lookup table that maps a local controller identifier to a controller long-term public key (LTPKC) for controllers that have completed a local pair setup or pair add process, e.g., as described above, with accessory 800), and a list of relay pairings 846 (e.g., controller RAs and associated access tokens for controllers that have established a relay pairing, e.g., as described above, with accessory 800). In some embodiments, pairing information can be stored such that a local pairing 844 is mapped to the corresponding relay pairing 846 in instances where both a local pairing and a relay pairing with the controller have been established. In some embodiments, secure storage module 838 can be omitted; keys and lists of paired controllers can be stored in storage device 828.

In some embodiments, cryptographic operations can be implemented in a cryptographic logic module 840 that communicates with secure storage module 838. Physically, cryptographic logic module 840 can be implemented in the same integrated circuit with secure storage module 838 or a different integrated circuit (e.g., a processor in processing subsystem 830) as desired. Cryptographic logic module 840 can include various logic circuits (fixed or programmable as desired) that implement or support cryptographic operations of accessory 800, including any or all cryptographic operations described above. Secure storage module 838 and/or cryptographic logic module 840 can appear as a "black box" to the rest of accessory 800. Thus, for instance, communication interface 836 can receive a message in encrypted form that it cannot decrypt and can simply deliver the message to processing subsystem 830. Processing subsystem 830 may also be unable to decrypt the message, but it can recognize the message as encrypted and deliver it to cryptographic logic module 840. Cryptographic logic module 840 can decrypt the message (e.g., using information extracted from secure storage module 838) and determine what information to return to processing subsystem 830. As a result, certain information can be available only within secure storage module 838 and cryptographic logic module 840. If secure storage module 838 and cryptographic logic module 840 are implemented on a single integrated circuit that executes code only from an internal secure repository, this can make extraction of the information extremely difficult, which can provide a high degree of security. Other implementations are also possible.

Accessory 800 can be any electronic apparatus that interacts with controller 900. In some embodiments, controller 900 can provide remote control over operations of accessory 800 as described below. For example controller 900 can provide a remote user interface for accessory 800 that can include both input and output controls (e.g., a display screen to display current status information obtained from accessory 800 and an input control such as a touchscreen overlay to allow changes to the status information). Controller 900 in various embodiments can control any function of accessory 800 and can also receive data from accessory 800, via a local channel or a relay service 220, as shown in FIG. 2.

Figure 9:
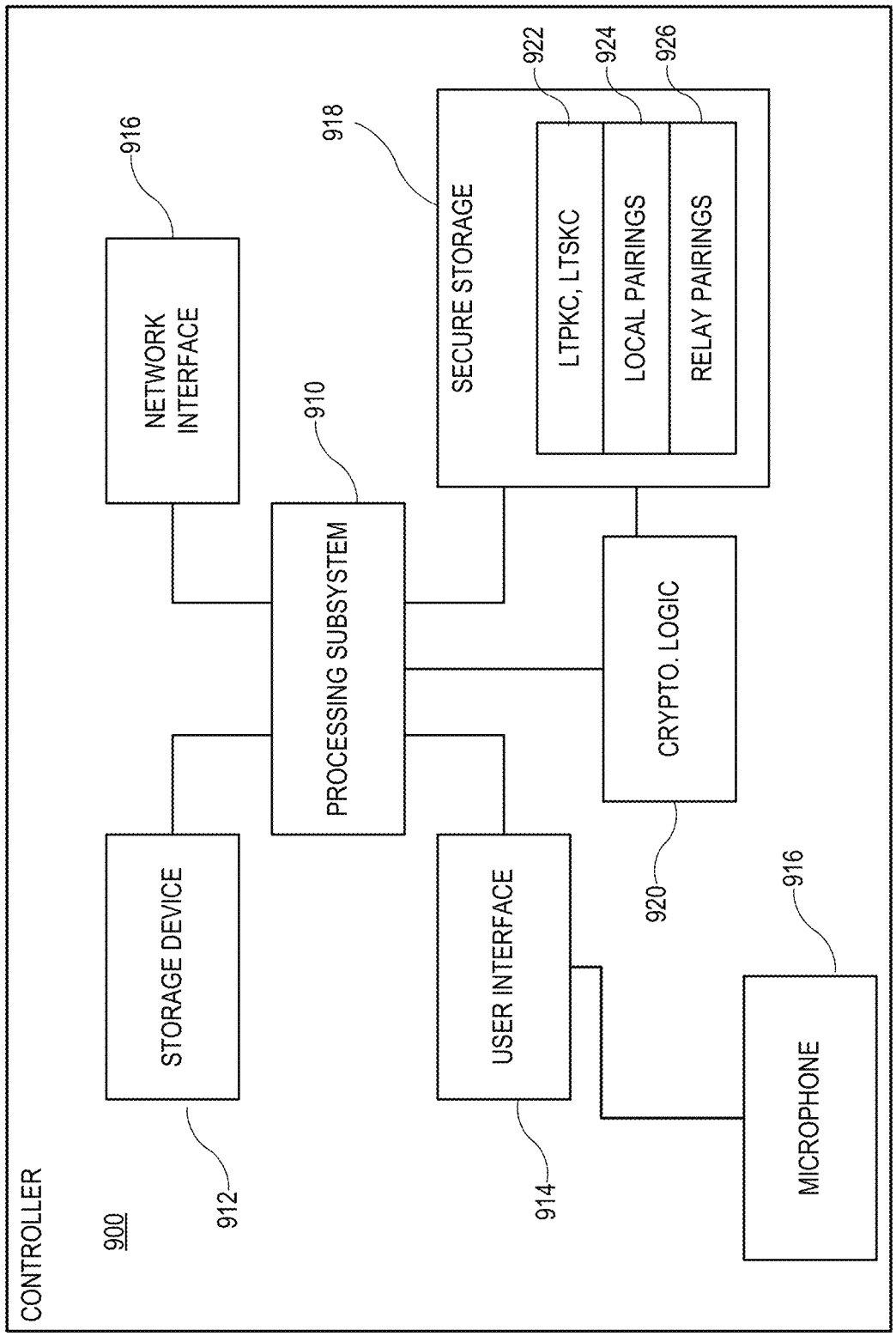
FIG. 9 illustrates a simplified block diagram of a controller according to an embodiment of the present disclosure.

FIG. 9 shows a simplified block diagram of a controller 900 according to an embodiment of the present disclosure. In some embodiments, controller 900 can implement any or all of the functions, behaviors, and capabilities described herein as being performed by a controller, as well as other functions, behaviors, and capabilities not expressly described. Controller 900 can include processing subsystem 910, storage device 912, user interface 914, communication interface 916, secure storage module 918, and cryptographic logic module 920. Controller 900 can also include other components (not explicitly shown) such as a battery, power controllers, and other components operable to provide various enhanced capabilities. In various embodiments, controller 900 can be implemented in a desktop computer, laptop computer, tablet computer, smart phone, other mobile phone, wearable computing device, or other systems having any desired form factor. Further, as noted above, controller 900 can be implemented partly in a base station and partly in a mobile unit that communicates with the base station and provides a user interface.

Storage device 912 can be implemented, e.g., using disk, flash memory, or any other non-transitory storage medium, or a combination of media, and can include volatile and/or non-volatile media. In some embodiments, storage device 912 can store one or more application and/or operating system programs to be executed by processing subsystem 910, including programs to implement various operations described above as being performed by a controller. For example, storage device 912 can store a uniform controller application that can read an accessory description record and generate a graphical user interface for controlling the accessory based on information therein. Storage device 912 can also store program code executable to communicate with a relay service 220, as shown in FIG. 2, e.g., as described above. In some embodiments, portions (or all) of the controller functionality described herein can be implemented in operating system programs rather than applications. In some embodiments, storage device 912 can also store apps designed for specific accessories or specific categories of accessories (e.g., an IP camera app to manage an IP camera accessory or a security app to interact with door lock accessories).

User interface 914 can include input devices such as a touch pad, touch screen, scroll wheel, click wheel, dial, button, switch, keypad, communication interface 916 (e.g., a microphone), or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 914 to invoke the functionality of controller 900 and can view and/or hear output from controller 900 via output devices of user interface 914.

Processing subsystem 910 can be implemented as one or more integrated circuits, e.g., one or more single-core or multi-core microprocessors or microcontrollers, examples of which are known in the art. In operation, processing system 910 can control the operation of controller 900. In various embodiments, processing subsystem 910 can execute a variety of programs in response to program code and can maintain multiple concurrently executing programs or processes. At any given time, some or all of the program code to be executed can be resident in processing subsystem 910 and/or in storage media such as storage device 912.

Through suitable programming, processing subsystem 910 can provide various functionality for controller 900. For example, in some embodiments, processing subsystem 910 can implement various processes (or portions thereof) described above as being implemented by a controller. Processing subsystem 910 can also execute other programs to control other functions of controller 900, including application programs that may be stored in storage device 912. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above, and can include communicating with the accessory via a relay service 220, as shown in FIG. 2, as described above.

Communication interface 916 can provide voice and/or data communication capability for controller 900. In some embodiments, a communication interface 916 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments, a communication interface 916 can provide wired network connectivity (e.g., Ethernet) in addition to or instead of a wireless interface. Communication interface 916 can be implemented using a combination of hardware (e.g., driver circuits, antennas, modulators/demodulators, encoders/decoders, and other analog and/or digital signal processing circuits) and software components. In some embodiments, communication interface 916 can support multiple communication channels concurrently or at different times, using the same transport or different transports. Thus, for example, controller 900 can communicate with accessories via a local channel at some times and via a relay service 220, as shown in FIG. 2, at other times.

Secure storage module 918 can be an integrated circuit or the like that can securely store cryptographic information for controller 900. Examples of information that can be stored within secure storage module 918 include the controller's long-term public and secret keys 922 (LTPKC, LTSKC), a list of local pairings 924 (e.g., a lookup table that maps a local accessory identifier to an accessory long-term public key (LTPKA) for accessories that have completed a local pair setup or pair add process, e.g., as described above, with controller 900), and a list of relay pairings 926 (e.g., accessory RAs and associated access tokens for accessories that have established a relay pairing, e.g., as described above, with controller 900). In some embodiments, pairing information can be stored such that a local pairing 924 is mapped to the corresponding relay pairing 926 in instances where both a local pairing and a relay pairing with the accessory have been established.

In some embodiments, cryptographic operations can be implemented in a cryptographic logic module 920 that communicates with secure storage module 918. Physically, cryptographic logic module 920 can be implemented in the same integrated circuit with secure storage module 918 or a different integrated circuit (e.g., a processor in processing subsystem 910) as desired. Cryptographic logic module 920 can include various logic circuits (fixed or programmable as desired) that implement or support cryptographic operations of controller 900, including any or all cryptographic operations described above. Secure storage module 918 and/or cryptographic logic module 920 can appear as a "black box" to the rest of controller 900. Thus, for instance, communication interface 916 can receive a message in encrypted form that it cannot decrypt and can simply deliver the message to processing subsystem 910. Processing subsystem 910 may also be unable to decrypt the message, but it can recognize the message as encrypted and deliver it to cryptographic logic module 920. Cryptographic logic module 920 can decrypt the message (e.g., using information extracted from secure storage module 918) and determine what information to return to processing subsystem 910. As a result, certain information can be available only within secure storage module 918 and cryptographic logic module 920. If secure storage module 918 and cryptographic logic module 920 are implemented on a single integrated circuit that executes code only from an internal secure repository, this can make extraction of the information extremely difficult, which can provide a high degree of security. Other implementations are also possible.

Further, while a controller is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Controllers and accessories described herein can be implemented in electronic devices that can be of generally conventional design. Such devices can be adapted to communicate using a uniform accessory protocol that supports command-and-control operations by which a controller (a first electronic device) can control operation of an accessory (a second electronic device). In some instances, a device can combine features or aspects of a controller and an accessory, e.g., in the case of a proxy as described above.

It will be appreciated that the system configurations and components described herein are illustrative and that variations and modifications are possible. It is to be understood that an implementation of controller 900 can perform all operations described above as being performed by a computing device and that an implementation of accessory 800 can perform any or all operations described above as being performed by an accessory. A proxy, bridge, tunnel, or coordinator can combine components of controller 900 and accessory 800, using the same hardware or different hardware as desired. The computing device and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular computing device but is accessible via another controller or by interacting directly with the accessory.

Further, while the computing device and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

As described above, one aspect of the present technology is the gathering and use of data available from various sources for use in a home networking environment. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used for secure frame management of home devices. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of home network control, the present technology can be configured to allow users to select to "opt in" or "opt out" of participation in the collection of personal information data during registration for services or anytime thereafter. In another example, users can select not to provide person information for home network setup. mood-associated data for targeted content delivery services. In yet another example, users can select to limit the amount of personal data is maintained by the home network. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the home network, or publicly available information.

Thus, although the disclosure has been described with respect to specific embodiments, it will be appreciated that the disclosure is intended to cover all modifications and equivalents within the scope of the following claims.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims), are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise be read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
receiving, by a computing device, one or more frames of a video stream and accompanying metadata from a camera;
reviewing, by the computing device, each frame of the one or more frames of the video stream for a triggering item;
in accordance with detection of the triggering item in at least one frame of the one or more frames of the video stream:
encrypting, by the computing device, a portion of the one or more frames of the video stream and a portion of the accompanying metadata;
transmitting, to a storage device via a connection between the computing device and the network storage device, the encrypted portion of the one or more frames of the video stream and the encrypted portion of the accompanying metadata;
encrypting, by the computing device, one or more subsequent frames of the video stream and subsequent metadata;
transmitting, to the storage device, the encrypted one or more subsequent frames of the video stream and the encrypted subsequent metadata; and
in accordance with detection of an absence of the triggering item in at least one subsequent frame of the one or more subsequent frames of the video stream:
terminating the connection between the computing device and the storage device.

2. The method of claim 1, wherein the storage device is configured to store the encrypted portion of the one or more frames of the video stream and the encrypted portion of the accompanying metadata in a container, and wherein the storage device is configured to append the encrypted one or more subsequent frames of the video stream onto the encrypted portion of the one or more frames of the video stream and to store the encrypted subsequent metadata in the container to enable the one or more frames of the video stream and the subsequent frames of the video stream to be played as a single video file.

3. The method of claim 1, wherein the triggering item comprises at least one of a person, a vehicle, or an animal.

4. The method of claim 1, further comprising establishing the connection between the computing device and the storage device in accordance with the detection of the triggering item in at least one frame of the one or more frames of the video stream.

5. The method of claim 1, further comprising classifying, by the computing device, the one or more frames of the video stream by at least comparing one or more aspects of the one or more frames of the video stream from the camera against one or more criteria.

6. The method of claim 5, wherein the classifying comprises utilizing an image recognition technique to determine a classification of the one or more frames of the video stream.

7. The method of claim 1, further comprising decrypting the one or more frames of the video stream from the camera.

8. The method of claim 1, wherein the accompanying metadata identifies a start time and an end time of the one or more frames of the video stream.

9. One or more non-transitory computer-readable media having instructions stored thereon, wherein the instructions, when executed by one or more processors, cause the one or more processors to:
receive one or more frames of a video stream and accompanying metadata from a camera;
review each frame of the one or more frames of the video stream for a triggering item;
in accordance with detection of the triggering item in at least one frame of the one or more frames of the video stream:
encrypt a portion of the one or more frames of the video stream and a portion of the accompanying metadata;
transmit, to a storage device via a connection between the computing device and the storage device, the encrypted portion of the one or more frames of the video stream and the encrypted portion of the accompanying metadata;
encrypt one or more subsequent frames of the video stream and subsequent metadata; and
transmit, to the storage device, the encrypted one or more subsequent frames of the video stream and the encrypted subsequent metadata; and
in accordance with detection of an absence of the triggering item in at least one subsequent frame of the one or more subsequent frames of the video stream:
terminate the connection between the computing device and the storage device.

10. The one or more non-transitory computer-readable media of claim 9, wherein the storage device is configured to store the encrypted portion of the one or more frames of the video stream and the encrypted portion of the accompanying metadata in a container, and wherein the storage device is configured to append the encrypted one or more subsequent frames of the video stream onto the encrypted portion of the one or more frames of the video stream and to store the encrypted subsequent metadata in the container to enable the one or more frames of the video stream and the subsequent frames of the video stream to be played as a single video file.

11. The one or more non-transitory computer-readable media of claim 9, wherein the triggering item comprises at least one of a person, a vehicle, or an animal.

12. The one or more non-transitory computer-readable media of claim 9, wherein the instructions, when executed by the one or more processors, further cause the computing device to establish the connection between the computing device and the storage device in accordance with the detection of the triggering item in at least one frame of the one or more frames of the video stream.

13. The one or more non-transitory computer-readable media of claim 9, wherein the instructions, when executed by the one or more processors, further cause the computing device to classify the one or more frames of the video stream by at least comparing one or more aspects of the one or more frames of the video stream from the camera against one or more criteria.

14. The one or more non-transitory computer-readable media of claim 13, wherein to classify the one or more frames of the video stream comprises to utilize an image recognition technique to determine a classification of the one or more frames of the video stream.

15. The one or more non-transitory computer-readable media of claim 9, wherein the instructions, when executed by the one or more processors, further cause the computing device to decrypt the one or more frames of the video stream from the camera.

16. A computing device, comprising:
- memory to store frames of a video stream; and
- one or more processors coupled to the memory, the one or more processors to:
  - receive one or more frames of a video stream and accompanying metadata from a camera;
  - review each frame of the one or more frames of the video stream for a triggering item;
  - in accordance with detection of the triggering item in at least one frame of the one or more frames of the video stream:
    - encrypt a portion of the one or more frames of the video stream and a portion of the accompanying metadata;
    - transmit, to a storage device via a connection between the computing device and the storage device, the encrypted portion of the one or more frames of the video stream and the encrypted portion of the accompanying metadata;
    - encrypt one or more subsequent frames of the video stream and subsequent metadata; and
    - transmit, to the storage device, the encrypted one or more subsequent frames of the video stream and the encrypted subsequent metadata; and
  - in accordance with detection of an absence of the triggering item in at least one subsequent frame of the one or more subsequent frames of the video stream:
    - terminate the connection between the computing device and the storage device.

17. The computing device of claim 16, wherein the storage device is configured to store the encrypted portion of the one or more frames of the video stream and the encrypted portion of the accompanying metadata in a container, and wherein the storage device is configured to append the encrypted one or more subsequent frames of the video stream onto the encrypted portion of the one or more frames of the video stream and to store the encrypted subsequent metadata in the container to enable the one or more frames of the video stream and the subsequent frames of the video stream to be played as a single video file.

18. The computing device of claim 16, wherein the triggering item comprises at least one of a person, a vehicle, or an animal.

19. The computing device of claim 16, wherein the one or more processors are further to establish the connection between the computing device and the storage device in accordance with the detection of the triggering item in at least one frame of the one or more frames of the video stream.

20. The computing device of claim 16, wherein the one or more processors are further to classify the one or more frames of the video stream by at least comparing one or more aspects of the one or more frames of the video stream from the camera against one or more criteria.

* * * * *